(12) United States Patent
He et al.

(10) Patent No.: US 11,809,738 B2
(45) Date of Patent: Nov. 7, 2023

(54) DATA STORAGE METHOD AND APPARATUS, COMPUTING DEVICE, STORAGE SYSTEM, AND STORAGE MEDIUM

(71) Applicant: Huawei Technologies Co., Ltd., Shenzhen (CN)

(72) Inventors: Changjun He, Chengdu (CN); Can Chen, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 128 days.

(21) Appl. No.: 17/579,865

(22) Filed: Jan. 20, 2022

(65) Prior Publication Data

US 2022/0147268 A1 May 12, 2022

Related U.S. Application Data

(63) Continuation of application No. PCT/CN2020/100795, filed on Jul. 8, 2020.

(30) Foreign Application Priority Data

Jul. 30, 2019 (CN) .......................... 201910697302.1

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ... G06F 3/0604; G06F 12/0246; G06F 3/0655
See application file for complete search history.

(56) References Cited

U.S. PATENT DOCUMENTS

| 2002/0194427 A1 | 12/2002 | Hashemi |
| 2006/0236029 A1* | 10/2006 | Corrado .............. G06F 11/1435 714/E11.034 |
| 2008/0115017 A1 | 5/2008 | Jacobson |
| 2014/0040661 A1 | 2/2014 | Goel |

(Continued)

FOREIGN PATENT DOCUMENTS

| CN | 102521074 A | 6/2012 |
| CN | 103970487 A | 8/2014 |

(Continued)

OTHER PUBLICATIONS

Pan, Y., et al., "DCS: Diagonal Coding Scheme for Enhancing the Endurance of SSD-Based RAID Arrays," IEEE Transactions on Computer-Aided Design of Integrated Circuits and Systems, vol. 35, No. 8, Aug. 2016, 14 pages.

*Primary Examiner* — Jae U Yu
(74) *Attorney, Agent, or Firm* — Conley Rose, P.C.

(57) ABSTRACT

A data storage method, a computing device, and a storage system determine, from S stripes, chunks written in one batch, wherein a quantity of chunks that are in the chunks written in one batch and that belong to a same stripe is less than or equal to N, where each of the S stripes comprises (M+N) chunks, where the (M+N) chunks comprise M data chunks and N parity chunks, and where S, M, and N are positive integers, and in turn write the chunks written in one batch to M+N storage devices.

20 Claims, 12 Drawing Sheets

(56) References Cited

U.S. PATENT DOCUMENTS

| | | |
|---|---|---|
| 2014/0325262 A1 | 10/2014 | Cooper et al. |
| 2015/0193160 A1 | 7/2015 | Li et al. |
| 2016/0357634 A1 | 12/2016 | Wang et al. |
| 2017/0206135 A1 | 7/2017 | Zeng |
| 2019/0012236 A1 | 1/2019 | Hitron et al. |
| 2020/0334106 A1 | 10/2020 | Dong et al. |

FOREIGN PATENT DOCUMENTS

| | | |
|---|---|---|
| CN | 104765693 A | 7/2015 |
| CN | 105095013 A | 11/2015 |
| CN | 106662983 A | 5/2017 |
| CN | 108874312 A | 11/2018 |
| CN | 109213420 A | 1/2019 |
| CN | 109558066 A | 4/2019 |
| CN | 109918228 A | 6/2019 |
| CN | 110018783 A | 7/2019 |
| CN | 110515542 A | 11/2019 |
| EP | 3208714 A1 | 8/2017 |

\* cited by examiner

| D00 | D01 | D02 | D03 | D04 | D05 | D06 | P0 | Stripe 0 |
| --- | --- | --- | --- | --- | --- | --- | --- | --- |
| D10 | D11 | D12 | D13 | D14 | D15 | D16 | P1 | Stripe 1 |
| D20 | D21 | D22 | D23 | D24 | D25 | D26 | P2 | Stripe 2 |
| D30 | D31 | D32 | D33 | D34 | D35 | D36 | P3 | Stripe 3 |
| D40 | D41 | D42 | D43 | D44 | D45 | D46 | P4 | Stripe 4 |
| D50 | D51 | D52 | D53 | D54 | D55 | D56 | P5 | Stripe 5 |
| D60 | D61 | D62 | D63 | D64 | D65 | D66 | P6 | Stripe 6 |
| D70 | D71 | D72 | D73 | D74 | D75 | D76 | P7 | Stripe 7 |

FIG. 7

| | | | | | | | | |
|---|---|---|---|---|---|---|---|---|
| D00 | D01 | D02 | D03 | D04 | D05 | P0 | Q0 | Stripe 0 |
| D10 | D11 | D12 | D13 | D14 | D15 | P1 | Q1 | Stripe 1 |
| D20 | D21 | D22 | D23 | D24 | D25 | P2 | Q2 | Stripe 2 |
| D30 | D31 | D32 | D33 | D34 | D35 | P3 | Q3 | Stripe 3 |
| D40 | D41 | D42 | D43 | D44 | D45 | P4 | Q4 | Stripe 4 |
| D50 | D51 | D52 | D53 | D54 | D55 | P5 | Q5 | Stripe 5 |
| D60 | D61 | D62 | D63 | D64 | D65 | P6 | Q6 | Stripe 6 |
| D70 | D71 | D72 | D73 | D74 | D75 | P7 | Q7 | Stripe 7 |
| D80 | D81 | D82 | D83 | D87 | D85 | P8 | Q8 | Stripe 8 |
| D90 | D91 | D92 | D93 | D94 | D95 | P9 | Q9 | Stripe 9 |
| DA0 | DA1 | DA2 | DA3 | DA4 | DA5 | PA | QA | Stripe 10 |
| DB0 | DB1 | DB2 | DB3 | DB4 | DB5 | PB | QB | Stripe 11 |

FIG. 8

DATA STORAGE METHOD AND APPARATUS, COMPUTING DEVICE, STORAGE SYSTEM, AND STORAGE MEDIUM

CROSS-REFERENCE TO RELATED APPLICATIONS

This is a continuation of International Patent Application No. PCT/CN2020/100795 filed on Jul. 8, 2020, which claims priority to Chinese Patent Application No. 201910697302.1 filed on Jul. 30, 2019. The disclosures of the aforementioned applications are hereby incorporated by reference in their entireties.

TECHNICAL FIELD

This disclosure relates to the field of storage technologies, and in particular, to a data storage method and apparatus, a computing device, a storage system, and a storage medium.

BACKGROUND

With development of storage technologies, to improve reliability of data storage, data is usually redundantly stored in a manner such as a redundant array of independent disks (RAID) or an erasure code (EC) technology, so that lost data can be recovered by using redundant data.

In a related technology, a data storage procedure usually includes that a computing device obtains to-be-stored data, and divides the data into one or more stripes, for each of the one or more stripes, the computing device divides the stripe into M data chunks, the computing device encodes the M data chunks by using a redundancy algorithm, to obtain N parity chunks, the computing device determines M+N chunks in each stripe, uses the M+N chunks as chunks written in one batch, and respectively writes (M+N) chunks in one stripe to M+N storage devices at a same moment in an order from the $1^{st}$ stripe to the last stripe, and each of the M+N storage devices receives one chunk in a same stripe at a same moment, stores the received chunk in a buffer, and stores the chunk in the buffer persistently. For example, M is 7 and N is 1. Because M+N is 8, chunks written in one batch include eight chunks. The computing device first determines eight chunks in the $1^{st}$ stripe as chunks written in a first batch, and respectively writes the eight chunks in the $1^{st}$ stripe to eight storage devices. In this case, the eight chunks in the $1^{st}$ stripe are respectively buffered into the eight storage devices at a same moment. The computing device first determines eight chunks in the $2^{nd}$ stripe as chunks written in a second batch, and respectively writes the eight chunks in the $2^{nd}$ stripe to eight storage devices at a same moment. In this case, the eight chunks in the $2^{nd}$ stripe are also respectively buffered into eight storage devices at a same moment. The reset may be deduced by analogy. Each time a batch of writing is performed, all chunks in a same stripe are written until chunks in the last stripe are respectively written to eight storage devices.

For a same stripe, when one or more chunks in the stripe are lost, when a quantity of lost chunks is less than or equal to N, the one or more lost chunks may be recovered based on a redundancy algorithm by using a remaining chunk in the stripe, when a quantity of lost chunks is greater than N, the one or more lost chunks cannot be recovered. M is a positive integer greater than or equal to 1, and N is a positive integer greater than or equal to 1.

When data is stored by using the foregoing method, when the M+N storage devices simultaneously have a power failure, all data buffered in the M+N storage devices is lost. For a same stripe, because each chunk in the stripe is written to each storage device at a same or similar moment, each chunk in the stripe is buffered into each storage device at a same or similar moment. When the buffer moment is exactly during the period of the power failure, all chunks in the stripe are lost. Once all the chunks in the stripe are lost, the stripe cannot be recovered by using the redundancy algorithm. To avoid a data loss caused by this situation, a backup power supply needs to be installed in a storage device. When the storage device has a power failure, the backup power supply supplies power to the storage device. The storage device stores buffered data into a non-volatile storage medium by using the power supplied by the backup power supply. However, the backup power supply occupies inner space of the storage device, affects a storage capacity of the storage device, and increases costs of the storage device.

SUMMARY

This disclosure provides a data storage method and apparatus, a computing device, a storage system, and a storage medium, to prevent, without relying on backup power supplies of storage devices, stripes buffered in the storage devices from getting lost when all the storage devices simultaneously have a power failure, thereby breaking a limitation that a backup power supply needs to be installed on a storage device.

According to a first aspect, a data storage method is provided. The method includes determining, from S stripes, chunks written in one batch, where a quantity of chunks that are in the chunks written in one batch and that belong to a same stripe is less than or equal to N, each of the S stripes includes (M+N) chunks, the (M+N) chunks include M data chunks and N parity chunks, and S, M, and N are positive integers, and respectively writing the chunks written in one batch to M+N storage devices.

This embodiment provides a solution in which a loss of stripes buffered in storage devices can be avoided without relying on backup power supplies of the storage devices when all the storage devices simultaneously have a power failure. By improving an order of writing chunks in each stripe to storage devices, M+N chunks written in one batch to a same stripe are improved as N or fewer chunks written in one batch to a same stripe. In this case, for each stripe, because a quantity of chunks in the stripe that are simultaneously written to M+N storage devices is less than or equal to N, a quantity of chunks in the stripe that are simultaneously buffered to the M+N storage devices is also less than or equal to N. Therefore, even if all data buffered in the M+N storage devices is lost because the M+N storage devices all have a power failure at any moment, the quantity of lost chunks in the stripe is less than or equal to N. Therefore, a lost chunk in the stripe can be recovered by using a redundancy algorithm, thereby avoiding losing data of the stripe. By using this solution, even if a storage device has no backup power supply, a data loss can be avoided, and reliability of data storage can be ensured. Therefore, the backup power supply does not need to be installed for the storage device. In this way, inner space occupied by the backup power supply in the storage device can be saved, so that the storage device can have larger inner space to place a storage medium, thereby improving a storage capacity of the storage device. In addition, costs of manufacturing the backup power supply can be saved, thereby reducing costs of the storage device. Furthermore, a limitation caused by the backup power supply to a service life of the storage device can be avoided.

Optionally, a quantity of chunks that are in the chunks written in one batch and that belong to a same stripe is less than or equal to N includes, when N is equal to 1, each of the chunks written in one batch belongs to a different stripe.

In this optional manner, a case of one or more parity chunks is considered. When one stripe has one parity chunk, for any of the S stripes, each of chunks written in one batch belongs to a different stripe. After writing of any batch is performed, in the chunks buffered in the M+N storage devices at a same or similar moment, there is at most only one chunk belonging to the stripe. Therefore, after the M+N storage devices simultaneously have a power failure at any moment, in the chunks buffered in the M+N storage devices, there is at most only one chunk belonging to the stripe. Therefore, at most one chunk in the stripe is lost in the M+N storage devices, and the stripe can be recovered by using M+N−1 remaining chunks. When one stripe has a plurality of parity chunks, for any one of the S stripes, a quantity of chunks that are in chunks written in each batch and that belong to a same stripe is less than or equal to N. After chunks in any batch are written, in the chunks buffered in the M+N storage devices at a same or similar moment, a quantity of chunks belonging to the stripe ranges from 1 to N. Therefore, after the M+N storage devices simultaneously have a power failure at any moment, in the chunks buffered in the M+N storage devices, there are at most N chunks belonging to the stripe. Therefore, at most N chunks in the stripe are lost in the M+N storage devices, and the stripe can be recovered by using a remaining chunk.

Optionally, for a same storage device in the M+N storage devices, a chunk that is in the chunks written in one batch and that is written to the storage device and a chunk that is in chunks written in a previous batch and that is written to the storage device belong to different stripes.

In this optional manner, for a same storage device, a chunk that is in chunks written in one batch to the storage device and a chunk that is in chunks written in a previous batch to the storage device belong to different stripes. In this case, when a chunk in the stripe j is written to a storage device i in the previous batch, a chunk in a stripe other than the stripe j is written to the storage device i in the current batch, and a chunk in the stripe j is written to a storage device other than the storage device i. Therefore, it can be ensured that different chunks in a same stripe are respectively stored in different storage devices. For example, eight chunks in a stripe of a 7+1 structure may be respectively stored in 8 different solid-state drives (SSDs). However, for a redundancy algorithm such as an EC algorithm or a RAID algorithm, it is usually required that data can be recovered only if different chunks in a stripe are stored in different storage devices. Therefore, such a manner can satisfy the requirement of the redundancy algorithm.

Optionally, S is obtained based on M, N, and K, and K is a maximum quantity of chunks buffered in each storage device.

Optionally, S is obtained by using the following formula:

$$S \geq \mathrm{ceil}\left(\frac{(M+N)*K}{N}\right),$$

where ceil represents a rounding up operation.

In this optional manner, S stripes form one group. In each write process, different stripes in one group may be written together, thereby improving overall storage efficiency of this group of stripes.

Optionally, after respectively writing the chunks written in one batch to M+N storage devices, the method further includes, when a power failure event is detected, obtaining a first chunk and a second chunk in the S stripes, where the first chunk is a chunk that has not been written to the M+N storage devices yet, and the second chunk is a chunk that has been persistently stored in the M+N storage devices, and recovering data of a lost chunk in the S stripes based on the first chunk and the second chunk.

In this optional manner, when a storage device loses a buffered chunk due to a power failure, a chunk that has not been written to the storage device yet and a chunk that has been persistently stored in the storage device may be found, and the lost chunk may be recovered by using these remaining chunks that are not lost, thereby avoiding losing a stripe and improving reliability of storage.

According to a second aspect, a data storage apparatus is provided. The apparatus has a function of implementing data storage in any one of the first aspect or the optional manners of the first aspect. The apparatus includes at least one module, and the at least one module is configured to implement the data storage method provided in any one of the first aspect or the optional manners of the first aspect.

According to a third aspect, a computing device is provided. The computing device includes a processor and a memory, where the memory stores at least one instruction, and the instruction is executed by the processor to implement the method according to any one of the first aspect or the optional manners of the first aspect.

According to a fourth aspect, a storage system is provided. The storage system includes the computing device according to any one of the third aspect or the optional manners of the third aspect and M+N storage devices.

According to a fifth aspect, a computer-readable storage medium is provided. The storage medium stores at least one instruction, and the instruction is executed by a processor to implement the method according to any one of the first aspect or the optional manners of the first aspect.

According to a sixth aspect, a computer program is provided. The computer program is configured to perform the method according to any one of the first aspect or the optional manners of the first aspect.

According to a seventh aspect, a chip is provided. The chip includes a processing circuit and an output interface internally connected the processing circuit for communication. The processing circuit is configured to perform the method according to any one of the first aspect or the optional manners of the first aspect. The output interface is configured to respectively write chunks written in one batch into M+N storage devices.

BRIEF DESCRIPTION OF DRAWINGS

FIG. 7 is a schematic diagram of strips and chunks according to an embodiment of this disclosure;

FIG. 8 is a schematic diagram of strips and chunks according to an embodiment of this disclosure;

DESCRIPTION OF EMBODIMENTS

To make the objectives, technical solutions, and advantages of this disclosure clearer, the following further describes the implementations of this disclosure in detail with reference to the accompanying drawings.

The following describes terms used in this disclosure by using examples.

A RAID is a data protection method. In the RAID, a plurality of physical disk drives is combined into one or more logical units, thereby enabling redundant storage of data.

An EC is a data protection method. The EC divides data into data chunks, and expands or encodes the data chunks by using a redundancy algorithm. The data chunks are stored in a group of different positions or storage media.

A stripe (a data stripe) is a segment of continuous data formed after logical sequential data is segmented in a RAID technology or EC technology. Generally, the stripe is further divided into data chunks, so that parity chunks are calculated for the data chunks based on a RAID or EC algorithm, and different chunks are written to different storage devices.

A chunk (or a strip or a stripe unit) is a segment of sequential data written to a storage device or read from a storage device in the RAID or EC technology, and is generally obtained by dividing a stripe.

An SSD is a storage device that mainly uses a NAND flash memory integrated circuit component as a persistent memory.

The following describes an implementation environment provided in this disclosure by using examples.

Figure 1:
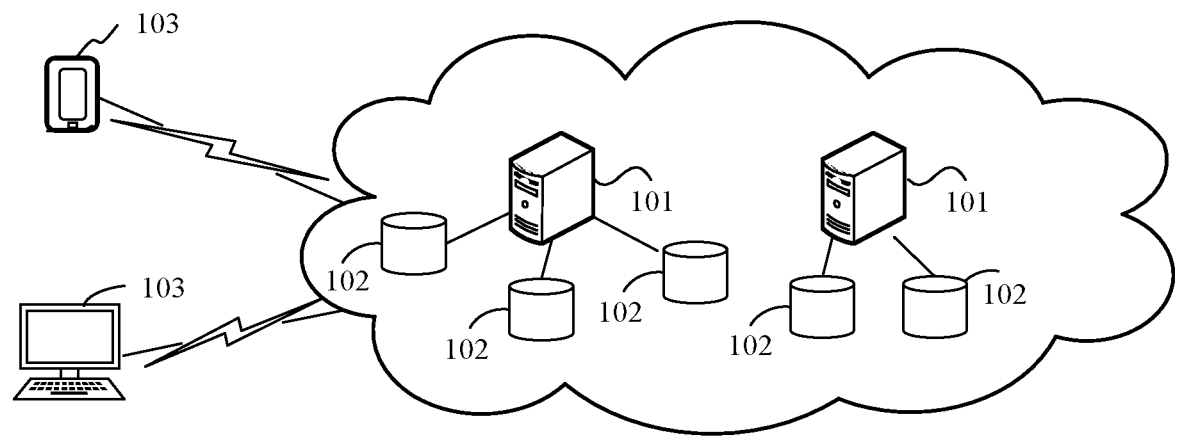
FIG. 1 is an architectural diagram of an implementation environment of a data storage method according to an embodiment of this disclosure.

FIG. 1 is an architectural diagram of an implementation environment of a data storage method according to an embodiment of this disclosure. The implementation environment includes a computing device 101, a storage device 102, and a client 103.

For example, the computing device 101 may be a server, a storage array controller, or the like. The storage device 102 may be an SSD, a hard disk drive (HDD), or the like. The client 103 may be any data access device, such as an application server, a host, or a terminal.

The computing device 101 and the storage device 102 may provide a data storage service for the client 103. Further, the client 103 may provide to-be-stored data from the computing device 101. The computing device 101 may obtain data from the client 103 and store the data in the storage device 102. For example, the client 103 may send an input/output (I/O) request to the computing device 101, where the I/O request carries to-be-stored data, and the computing device 101 may receive the I/O request from the client 103, obtain data from the I/O request, and store the data.

In some possible embodiments, the storage device 102 may be provided for a user as a cloud storage service. Further, the storage device 102 may run in a cloud environment, for example, may run on a public cloud, a private cloud, or a hybrid cloud. The user may apply for storage space of a specific capacity in the cloud storage service by using the client 103. The computing device 101 may allocate the storage space of the corresponding capacity to the user, for example, allocate one or more storage devices 102 to the user to store data in the allocated storage space. As an example, the storage device 102 may provide an object storage service (OBS), an elastic volume service, and a cloud database.

A person skilled in the art knows that there may be more or less computing devices 101, storage devices 102, and clients 103 in the foregoing implementation environment. For example, there may be only one computing device 101, or there may be dozens, hundreds, or more computing devices 101. In this case, the implementation environment further includes other computing devices 101.

A quantity of storage devices 102 connected to each computing device 101 may be greater than or equal to M+N, where M represents a quantity of data chunks, and N represents a quantity of parity chunks. For example, when one stripe includes seven data chunk and one parity chunk, the quantity of storage devices 102 may be greater than or equal to 8. Optionally, a plurality of computing devices 101 and a plurality of storage devices 102 may form a storage cluster, and provide a storage service together through cooperative running.

The following describes a hardware structure provided in this disclosure by using examples.

This disclosure provides a computing device. The computing device may be the computing device 101 in the foregoing implementation environment.

Figure 2:
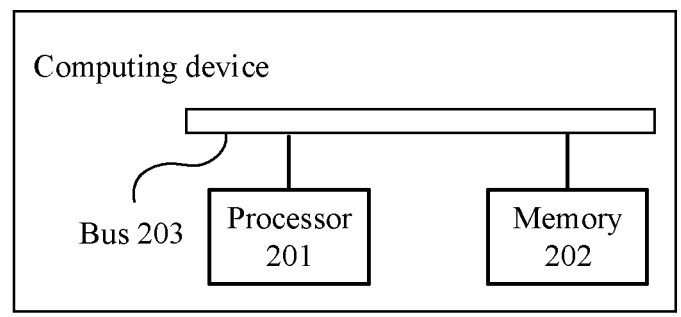
FIG. 2 is a schematic structural diagram of a computing device according to an embodiment of this disclosure.

As shown in FIG. 2, the computing device includes one or more processors 201 and one or more memories 202.

The processor 201 may be one or more central processing units (CPUs), field-programmable gate arrays (FPGA), application-specific integrated circuits (ASIC), programmable logic devices (PLD), controllers, state machines, gate logic, discrete hardware components, or any other suitable circuit.

The memory 202 stores at least one instruction. The processor 201 is configured to execute the instruction to implement step 601, step 602, step 603, step 604, and step 605 that are provided in the following method embodiment.

The memory 202 may be a data buffer. The memory 202 may be volatile memory, such as dynamic random-access memory (RAM) (DRAM), or may be a non-volatile memory, such as a persistent memory.

In some possible embodiments, the computing device may include a bus 203. The processor 201 and the memory 202 may be internally connected for communication by using the bus 203.

In some possible embodiments, the computing device may include a backup power supply. The backup power supply can store electricity. When the computing device runs, the backup power supply may be in a charging state. When the computing device has a power failure, the backup power supply may provide electricity to protect data buffered in the memory 202. For example, when the memory 202 is a volatile memory, when the computing device has a power failure, the backup power supply may provide electricity, and the data buffered in the memory 202 may be stored in other storage space by using the electricity provided by the backup power supply, thereby avoiding a loss of the data buffered in the memory 202 caused by the power failure. The backup power supply may be a battery, a capacitor, or an uninterruptible power supply (UPS).

This disclosure provides a storage device. The storage device may be the storage device 102 in the foregoing implementation environment.

Figure 3:
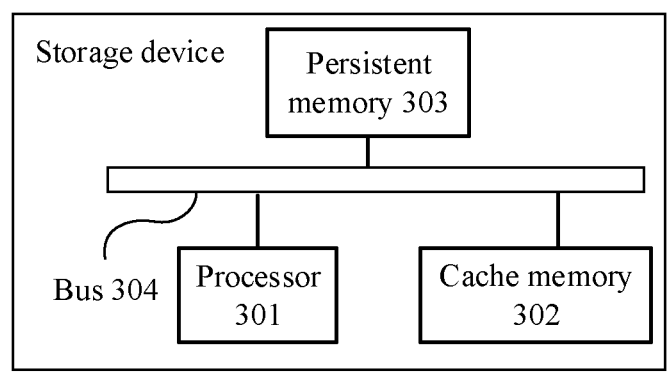
FIG. 3 is a schematic structural diagram of a storage device according to an embodiment of this disclosure.

As shown in FIG. 3, the storage device may include one or more processors 301, one or more cache memories 302, and one or more persistent memories 303.

The processor 301 may be one or more CPUs, FPGAs, ASICs, PLDs, controllers, state machines, gate logic, discrete hardware components, or any other suitable circuit.

The cache memory 302 may be but is not limited to a DRAM. The cache memory 302 is a volatile memory. When the storage device has a power failure, for example, when a device on which the storage device is located has a power failure or the storage device is suddenly plugged out, data in the cache memory 302 is lost. In the following method embodiments, the cache memory 302 may be configured to buffer a chunk written by a computing device. In a possible implementation, when the cache memory 302 can buffer a maximum of K chunks, after K chunks are buffered, the cache memory 302 may store the buffered chunks in the persistent memory 303 to persistently store the chunks.

The persistent memory 303 may be a non-volatile memory, for example, may be a flash memory, and further, may be a NAND flash memory. In the following method embodiments, the persistent memory 303 may be configured to receive a chunk from the cache memory 302, and persistently store the chunk.

In some possible embodiments, the storage device may further include a bus 304. The processor 301, the cache memory 302, and the persistent memory 303 may be internally connected for communication by using the bus 304.

Figure 4:
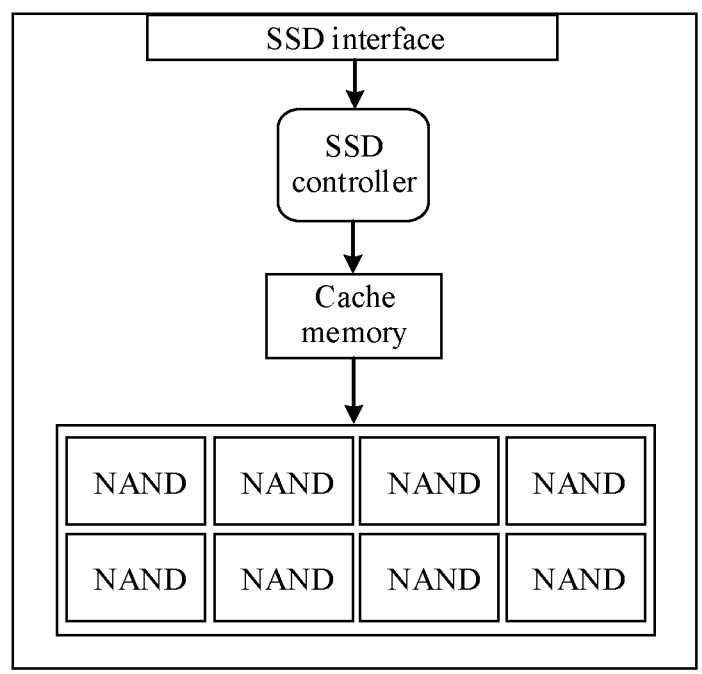
FIG. 4 is a schematic structural diagram of an SSD according to an embodiment of this disclosure.

An example the storage device is an SSD is used. FIG. 4 is a schematic structural diagram of an SSD according to this embodiment. The SSD may include an SSD interface, an SSD controller, a cache memory, and a NAND flash memory. The SSD interface may be connected to a computing device. As shown in FIG. 4, when the computing device sends a chunk to the SSD, the chunk is input from the SSD interface to the SSD, the SSD controller buffers the chunk in the cache memory, and the cache memory may store the chunk in the NAND flash memory. In addition, the computing device may provide electricity for the SSD through the SSD interface.

The following describes a storage system provided in this disclosure by using examples.

Figure 5:
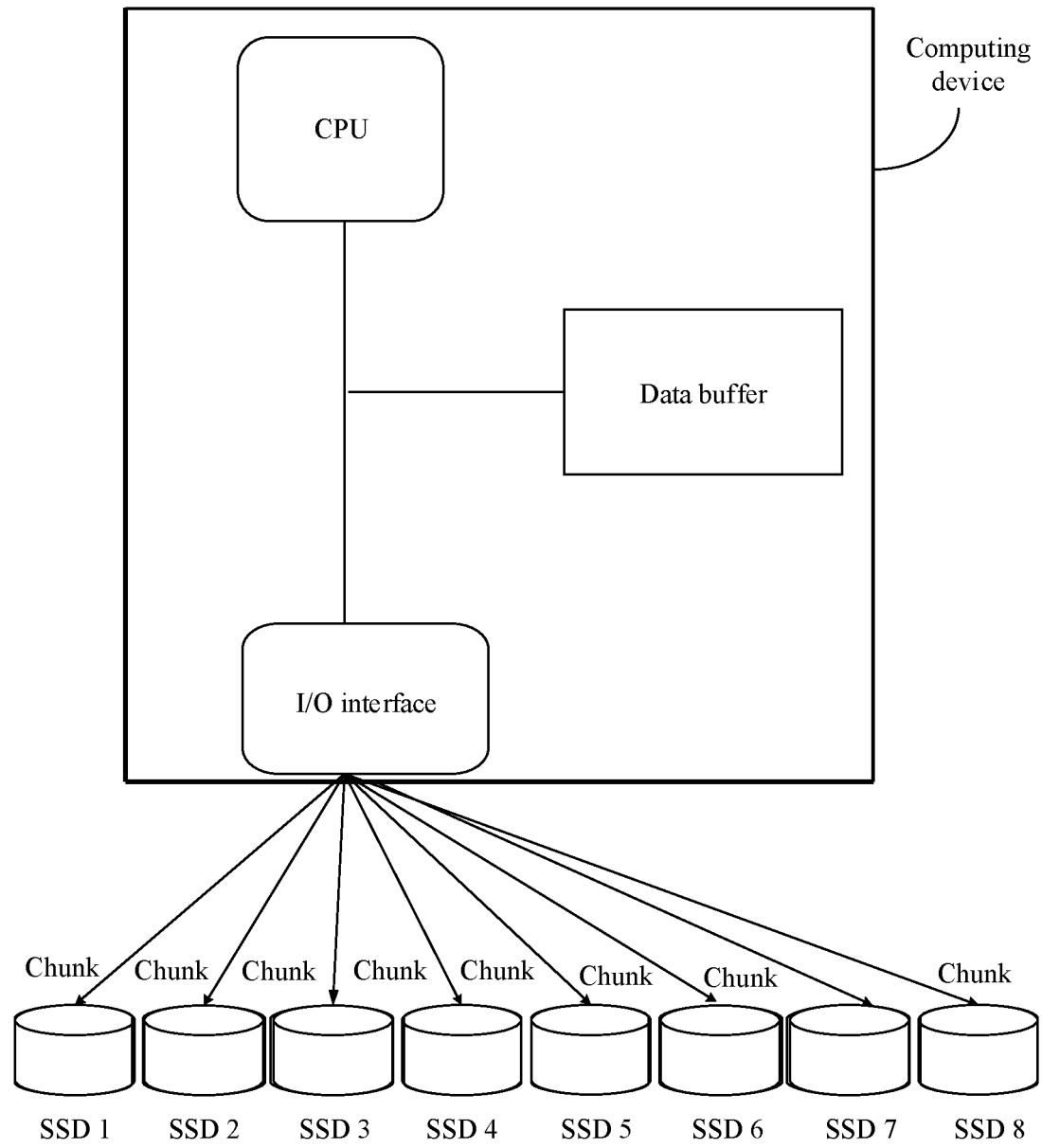
FIG. 5 is an architectural diagram of a storage system according to an embodiment of this disclosure.

This embodiment provides a storage system. The storage system may include the computing device shown in the embodiment in FIG. 2 and M+N storage devices, and the computing device may be connected to the M+N storage devices. For example, refer to FIG. 5. When M is 7 and N is 1, the computing device may be connected to eight SSDs, and the eight SSDs are an SSD 1 to an SSD 8 in FIG. 5.

The storage device may be disposed inside the computing device. For example, the storage device may be connected to the bus of the computing device, and the computing device may communicate with the storage device by using the bus. Certainly, the storage device may alternatively be disposed outside the computing device. For example, the computing device may be communicatively connected to the storage device 102 by using a switching device or a network. An example in which the SSD is a storage device is used. The computing device may include an I/O port, a chip, or an adapter, and is connected to the storage device by using a switching device or a network. In a possible scenario, when the computing device has a power failure, all storage devices connected to the computing device may have a power failure. By performing the method provided in the following embodiment, a loss of data buffered in the storage devices can be avoided.

The following describes a method procedure provided in this disclosure by using examples.

Figure 6:
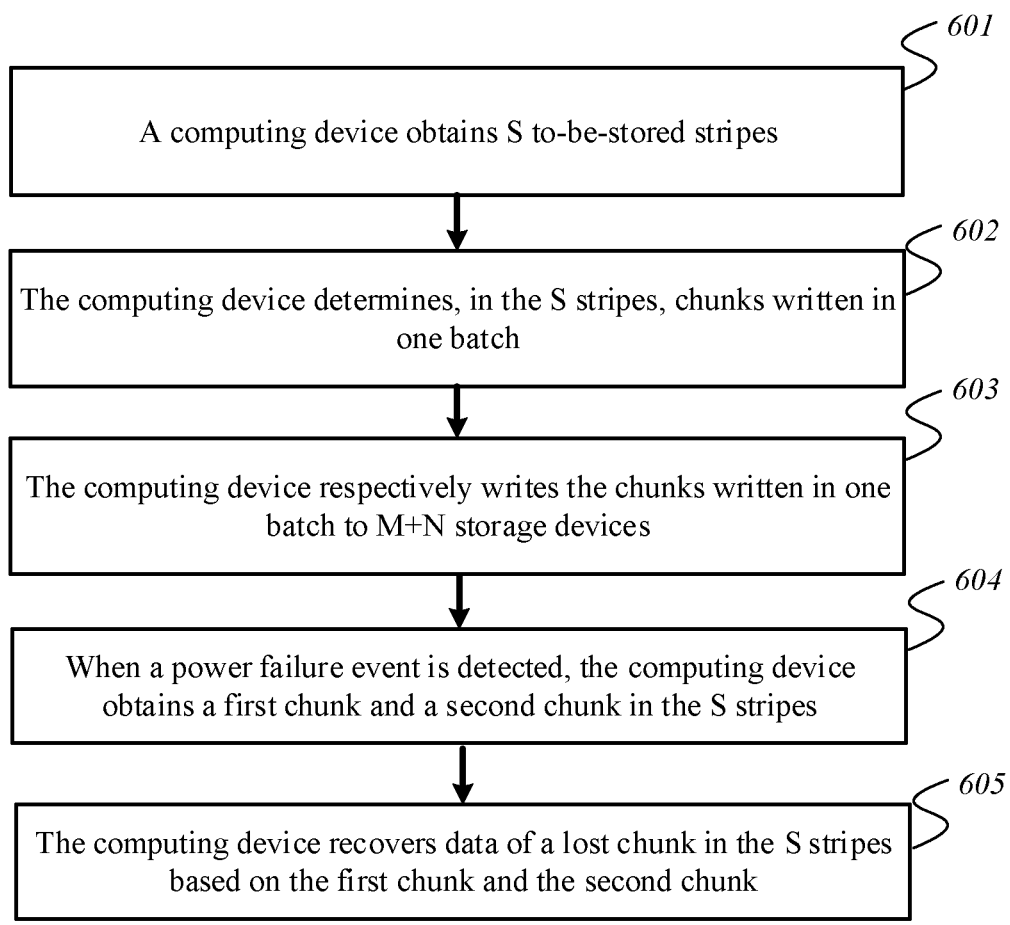
FIG. 6 is a flowchart of a data storage method according to an embodiment of this disclosure.

FIG. 6 is a flowchart of a data storage method according to an embodiment of this disclosure. The method may be applied to a computing device. The method may include the following steps 601 to 605.

601: The computing device obtains S to-be-stored stripes.

S represents a quantity of stripes, each of the S stripes includes (M+N) chunks, the (M+N) chunks include M data chunks and N parity chunks, M represents a quantity of data chunks, N represents a quantity of parity chunks, and S, M, and N are positive integers. N may be 1, or may be greater than or equal to 2. For example, one stripe may include seven data chunks and one parity chunk. For another example, one stripe may include six data chunks and two parity chunks. For still another example, one stripe may include six data chunks and three parity chunks. Specific quantities of parity chunks and data chunks included in one stripe are not limited in this embodiment.

For example, FIG. 7 shows 8 stripes, and each stripe includes 7 data chunks and 1 parity chunk, and FIG. 8 shows 12 stripes, and each stripe includes 6 data chunks and 2 parity chunks. Each row in FIG. 7 and FIG. 8 corresponds to one stripe, each column in FIG. 7 and FIG. 8 corresponds to chunks at a same position, and each box in FIG. 7 and FIG. 8 represents one chunk in one stripe. In FIG. 7 and FIG. 8, Dij represents a data chunk at a position j of a stripe i, Pi represents the $1^{st}$ parity chunk in the stripe i, Qi represents the $2^{nd}$ parity chunk in the stripe i, i is an identifier of a stripe, i is a positive integer greater than or equal to 0, j is an identifier of a chunk in the stripe, and j is a positive integer greater than or equal to 0.

Figure 9:
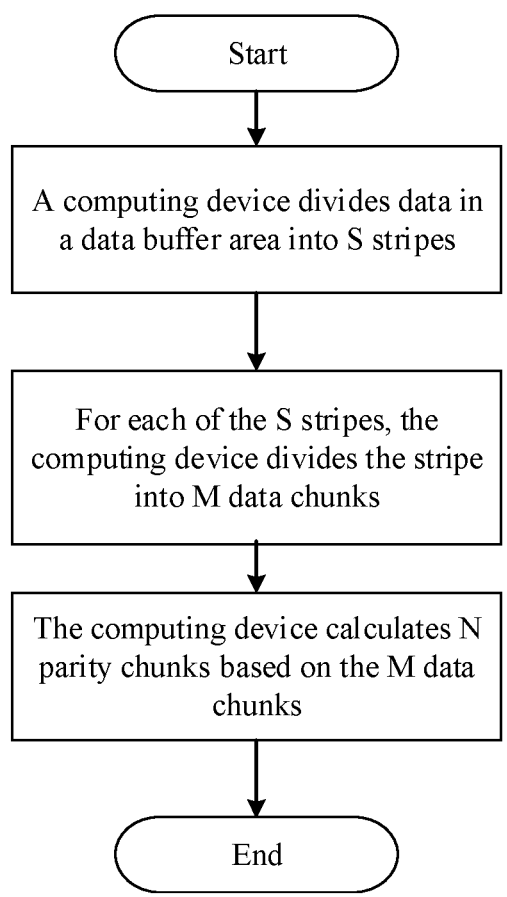
FIG. 9 is a flowchart of obtaining a stripe according to an embodiment of this disclosure.

For a process of obtaining a stripe, refer to FIG. 9. The process may include the following step 1 to step 3.

Step 1: A computing device divides data in a data buffer area into S stripes.

The computing device may obtain to-be-stored data, and buffer the data in the data buffer area. For example, the computing device may receive the to-be-stored data from a terminal through an I/O interface.

Step 2: For each of the S stripes, the computing device divides the stripe into M data chunks.

Step 3: The computing device calculates N parity chunks based on the M data chunks.

The computing device may encode the M data chunks by using a redundancy algorithm, to obtain the N parity chunks. The redundancy algorithm may be but is not limited to a RAID or EC algorithm.

In a possible implementation, the computing device may determine S based on M, N, and K, where K is a maximum quantity of chunks that can be buffered by the computing device, and K is a positive integer. S may be positively related to M, N, and K, and S may be negatively related to N.

It should be noted that obtaining S based on M, N, and K is only an optional manner rather than a mandatory manner. In some other possible embodiments, S may alternatively be determined in another manner. A manner of determining S is not limited in this embodiment.

In a possible implementation, the computing device may obtain S by using the following formula:

$$S \geq \text{ceil}\left(\frac{(M+N)*K}{N}\right),$$

where ceil represents a rounding up operation, for example, ceil(x) represents obtaining a minimum integer not less than x, * indicates multiplication, and - indicates division.

The following describes an example of a technical effect of this calculation manner of S.

For example, one stripe includes seven data chunks and one parity chunk, and one storage device can buffer a maximum of one chunk. When one chunk is lost in the stripe, after the chunk is lost, the lost chunk can be recovered based on a redundancy algorithm by using a remaining chunk. When two or more chunks are lost in the stripe, after the chunks are lost, the lost chunks cannot be recovered by using a remaining chunk. Therefore, a maximum of one chunk is lost in one stripe. In this embodiment, to ensure that no more than one chunk is lost in a same stripe when all storage devices have a power failure, only one chunk in a same stripe is written to the storage device in each write process. Because different chunks in a same stripe are written to storage devices at different moments, different chunks in a same stripe are buffered in the storage devices at different moments. To be specific, all the storage devices buffer a maximum of one chunk in a same stripe at any moment. Therefore, even if all the storage devices have a power failure at this moment, a maximum of one chunk is lost in the stripe, and the lost chunk may be recovered by using seven remaining chunks.

In this manner, each chunk in a stripe can be stored only after the stripe encounters eight write processes. In the $1^{st}$ write process, the $1^{st}$ data chunk in the stripe is written, in the $2^{nd}$ write process, the $2^{nd}$ data chunk in the stripe is written, in the $3^{rd}$ write process, the $3^{rd}$ data chunk in the stripe is written, and by analogy, in the $8^{th}$ write process, the $8^{th}$ data chunk in the stripe is written. When each stripe is written to each storage device in this serial manner, storage efficiency is relatively low.

In view of this, S stripes are combined into one group in the foregoing computing manner. A total quantity of stripes required by each group is (7+1)*1/1=8. Overall storage efficiency of one group of stripes is improved by writing different chunks in the eight stripes in this group together. For example, refer to FIG. 10. Eight strips may be obtained, and chunks in each of the eight strips may be written each time.

For example, one stripe includes six data chunks and two parity chunks, and one storage device can buffer a maximum of three chunks. When one or two chunks are lost in the stripe, after the one or two chunks are lost, the one or two lost chunks can be recovered based on a redundancy algorithm by using a remaining chunk. When three or more chunks are lost in the stripe, after the chunks are lost, the lost chunks cannot be recovered by using a remaining chunk. Therefore, a maximum of two chunks are lost in one stripe. In this embodiment, to ensure that no more than two chunks are lost in a same stripe when all storage devices have a power failure, a maximum of two chunks in a same stripe are written to the storage device in every three write processes. Because no more than two chunks in a same stripe are written to all storage devices at three adjacent moments, no more than two chunks in a same stripe are buffered to all the storage devices at three adjacent moments. To be specific, all the storage devices buffer a maximum of two chunks in a same stripe at three adjacent moments. Therefore, even if all the storage devices have a power failure at these moments, a maximum of two chunks are lost in the stripe, and the lost chunks may be recovered by using six remaining chunks.

In this manner, each chunk in a stripe can be stored only after the stripe encounters 8*3/2=12 write processes. In the $1^{st}$ write process to the $3^{rd}$ write process, the $1^{st}$ data chunk and the $2^{nd}$ data chunk in the stripe are written, in the $4^{th}$ write process to the $6^{th}$ write process, the $3^{rd}$ data chunk and the $4^{th}$ data chunk in the stripe are written, in the $7^{th}$ write process to the $9^{th}$ write process, the $5^{th}$ data chunk and the $6^{th}$ data chunk in the stripe are written, and in the $10^{th}$ write process to the $12^{th}$ write process, the $7^{th}$ data chunk and the $8^{th}$ data chunk in the stripe are written. when each stripe is written to each storage device in this serial manner, storage efficiency is relatively low. In view of this, to avoid affecting storage efficiency, chunks in a plurality of stripes may be combined into one group for storage, and a total quantity of stripes required in each group is (6+2)*3/2=12. For example, refer to FIG. 8. 12 strips may be obtained, and chunks in the 12 strips are subsequently written sequentially.

It should be noted that the foregoing formula is only an optional manner of the calculation manner of S rather than a mandatory manner. In some other possible embodiments, S may alternatively be determined in another manner other than the foregoing formula. A manner of calculating S is not limited in this embodiment.

602: The computing device determines, in the S stripes, chunks written in one batch, where a quantity of chunks that are in the chunks written in one batch and that belong to a same stripe is less than or equal to N.

The chunks written in one batch include chunks simultaneously written to M+N storage devices. Further, when each storage device buffers a maximum of one chunk, the chunks written in one batch may be M+N chunks, and each of the chunks written in one batch corresponds to one storage device. In step 603, each of the chunks written in one batch is written to a corresponding storage device. Chunks written in a same batch correspond to a same write moment. In other words, the chunks written in the same batch are written to the M+N storage devices at a same or similar moment.

When each storage device buffers a maximum of K chunks, where K is greater than 1, the chunks written in one batch may be (M+N)*K chunks, and K chunks in the chunks written in one batch correspond to one storage device. In step 603, K chunks in the chunks written in one batch are written to a storage device corresponding to the K chunks. The chunks written in the same batch correspond to K write moments. Further, at the $1^{st}$ write moment, M+N chunks in the chunks written in one batch are simultaneously written to the M+N storage devices, at the $2^{nd}$ write moment, other M+N chunks in the chunks written in one batch are simultaneously written to the M+N storage devices, and by analogy, at a $K^{th}$ write moment, the last M+N chunks in the chunks written in one batch are simultaneously written to the M+N storage devices. In this case, writing of the chunks written in the same batch are completed.

For ease of description, the M+N chunks simultaneously written to the M+N storage devices are defined as chunks in one write process below. When each storage device buffers a maximum of one chunk, chunks written in one batch are chunks in one write process. When each storage device buffers a maximum of K chunks, chunks written in one batch are chunks in K consecutive write processes.

In a possible implementation, an implementation of performing one write process may include that the computing device runs M+N threads, and each thread writes one buffered chunk to one storage device, where write moments of the M+N threads are the same. In this case, in this implementation, write moments of M+N chunks in a same write process are the same. In another possible implementation, an implementation of performing one write process may include that the computing device runs one thread, the thread first writes the $1^{st}$ buffered chunk to a storage device, and then writes the $2^{nd}$ buffered chunk to a next storage device, and by analogy, the thread sequentially writes M+N buffered chunks to corresponding storage devices. After writing any chunk to a storage device, the thread does not need to wait for an acknowledgment message returned by the storage device but directly writes a next chunk to a next storage device. In this implementation, write moments of M+N chunks in a same write process are approximately the same.

Figure 10:
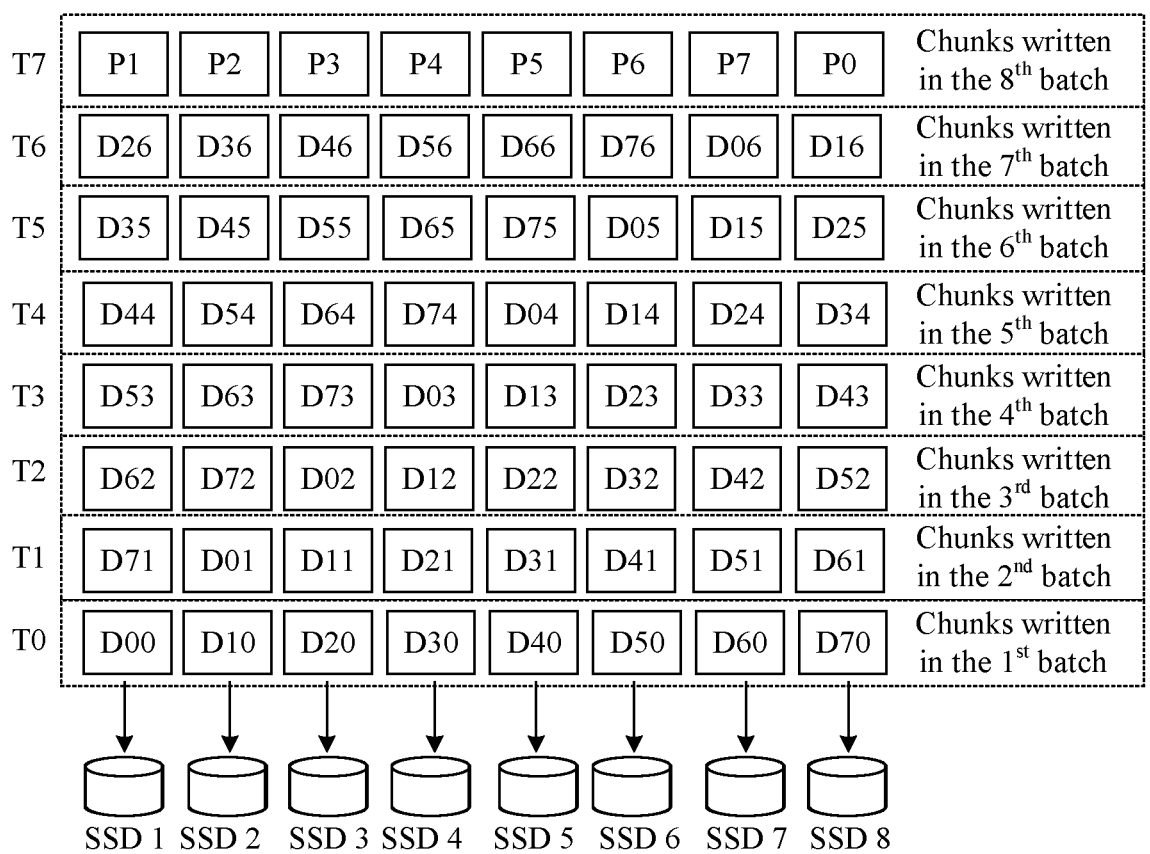
FIG. 10 is a schematic diagram of a write order according to an embodiment of this disclosure.

For example, refer to FIG. 10. When K is 1, chunks written in the $1^{st}$ batch may be chunks simultaneously written to an SSD 1 to an SSD 8 at a moment T0, chunks written in the $2^{nd}$ batch may be chunks simultaneously written to the SSD 1 to the SSD 8 at a moment T1, chunks written in the $3^{rd}$ batch may be chunks simultaneously written to the SSD 1 to the SSD 8 at a moment T2, and chunks written in the last batch may be chunks simultaneously written to the SSD 1 to the SSD 8 at a moment T7. Chunks simultaneously written to the SSD 1 to the SSD 8 are eight different chunks. For example, eight chunks written in the $1^{st}$ batch are a chunk D00 written to an SSD 1, a chunk D10 written to an SSD 2, a chunk D20 written to an SSD 3, a chunk D30 written to an SSD 4, a chunk D40 written to an SSD 5, a chunk D50 written to an SSD 6, a chunk D60 written to an SSD 7, and a chunk D70 written to an SSD 8.

Figure 11:
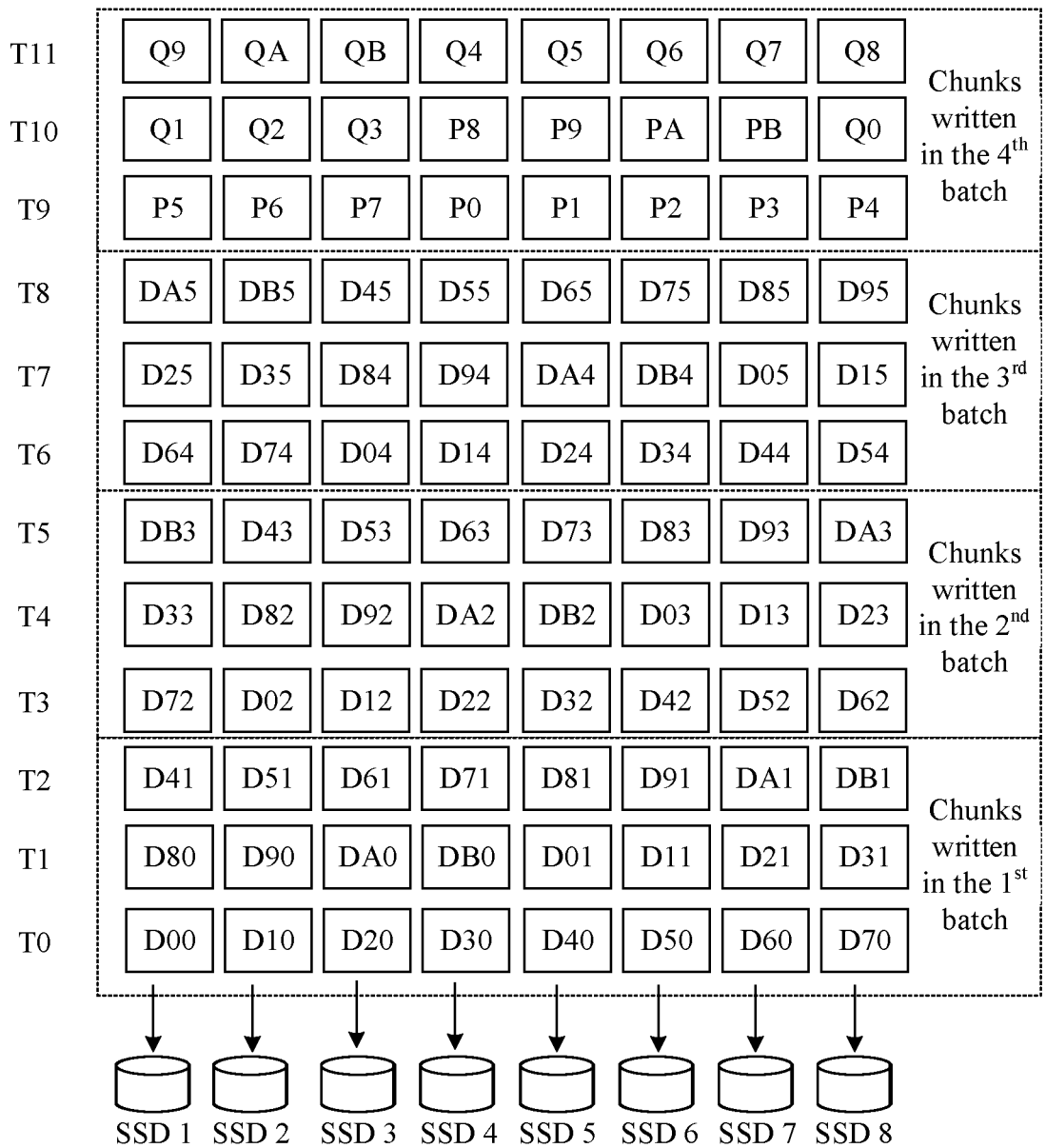
FIG. 11 is a schematic diagram of a write order according to an embodiment of this disclosure.

For example, refer to FIG. 11. When K is 3, chunks written in the $1^{st}$ batch may include chunks in three write processes, chunks in the $1^{st}$ write process in the $1^{st}$ batch are chunks simultaneously written to the SSD 1 to the SSD 8 at a moment T0, chunks in the $2^{nd}$ write process in the $1^{st}$ batch are chunks simultaneously written to the SSD 1 to the SSD 8 at a moment T1, and chunks in the $3^{rd}$ write process in the $1^{st}$ batch are chunks simultaneously written to the SSD 1 to the SSD 8 at a moment T2. Chunks written in the $2^{nd}$ batch include chunks in three write processes. Chunks in the $1^{st}$ write process the $2^{nd}$ batch are chunks simultaneously written to the SSD 1 to the SSD 8 at a moment T3, chunks in the $2^{nd}$ write process in the $2^{nd}$ batch are chunks simultaneously written to the SSD 1 to the SSD 8 at a moment T4, and chunks in the $3^{rd}$ write process in the $2^{nd}$ batch are chunks simultaneously written to the SSD 1 to the SSD 8 at a moment T5. By analogy, chunks written in the last batch include chunks in three write processes. Chunks in the $1^{st}$ write process in the last batch are chunks simultaneously written to the SSD 1 to the SSD 8 at a moment T9, chunks in the $2^{nd}$ write process in the last batch are chunks simultaneously written to the SSD 1 to the SSD 8 at a moment T10, and chunks in the 3rd write process in the last batch are chunks simultaneously written to the SSD 1 to the SSD 8 at a moment T11.

In this embodiment, a quantity of chunks that are in chunks written in each batch and that belong to a same stripe is less than or equal to N. Therefore, for any one of the S stripes, after any write process in any batch is performed, a quantity of chunks that are in chunks simultaneously buffered in the M+N storage devices and that belong to the stripe is less than or equal to N. In this case, when all data buffered on the M+N storage devices is lost due to a simultaneous power failure of the M+N storage devices at any moment, because the quantity of chunks that are in the chunks buffered in the M+N storage devices and that belong to the stripe is less than or equal to N, a maximum of N chunks are lost in the stripe. Therefore, even if a chunk is lost in the stripe, the lost chunk can be recovered by using a remaining chunk, thereby avoiding a loss of the stripe caused by the simultaneous power failure of the M+N storage devices.

Further, after the computing device performs any write process, each of the M+N storage devices receives one chunk and buffers one chunk. In this case, the M+N storage devices buffer a total of M+N chunks. Because write moments of chunks in a same write process are the same or approximately the same, each of the M+N storage devices receives a chunk at a same or similar moment, and each of the M+N storage devices buffers a chunk at a same or similar moment. Therefore, M+N chunks are simultaneously buffered in the M+N storage devices.

For example, refer to FIG. 10. When K is 1 and N is 1, a row of chunks is buffered in eight SSDs at each moment, and each chunk in this row of chunks belongs to a different stripe. When the computing device respectively writes eight chunks in the $1^{st}$ batch to the SSD 1 to the SSD 8 at a moment T0, where the eight chunks are a chunk D00, a chunk D10, and a chunk D20 to a chunk D70, each of the SSD 1 to the SSD 8 receives one of the eight chunks: the chunk D00, the chunk D10, and the chunk D20 to the chunk D70, and buffers one chunk. Because moments of writing performed to the eight SSDs are the same or approximately the same, each of the eight SSDs receives a chunk at a same or similar moment, and each of the eight SSDs buffers a chunk at a same or similar moment. Therefore, the chunk D00, the chunk D10, and the chunk D20 to the chunk D70 are buffered at a same or similar moment. The chunk D00, the chunk D10, and the chunk D20 to the chunk D70 respectively belong to different stripes. Therefore, even if the eight SSDs simultaneously have a power failure, and all data buffered in the eight SSDs is lost, causing losses of the chunk D00, the chunk D10, and the chunk D20 to the chunk D70, only one chunk is lost in each of eight strips: a stripe 0, and a stripe 1 to a stripe 7. Therefore, each of the eight stripes can be recovered, thereby ensuring that none of the eight stripes is lost. Similarly, when the computing device respectively writes eight chunks in the $2^{nd}$ batch to the SSD 1 to the SSD 8 at a moment T1, where the eight chunks are a chunk D71, a chunk D01, and a chunk D11 to a chunk D61, each of the SSD 1 to the SSD 8 receives one of the eight chunks: the chunk D71, the chunk D01, and the chunk D11 to the chunk D61, and buffers one chunk. Because moments of writing performed to the eight SSDs are the same or approximately the same, the chunk D71, the chunk D01, and the chunk D11 to the chunk D61 are buffered at a same or similar moment. The chunk D71, the chunk D01, and the chunk D11 to the chunk D61 respectively belong to different stripes. Therefore, even if the eight SSDs simultaneously have a power failure, and all data buffered in the eight SSDs is lost, causing losses of the chunk D71, the chunk D01, and the chunk D11 to the chunk D61, only one chunk is lost in each of eight strips: a stripe 0, and a stripe 1 to a stripe 7. Therefore, each of the eight stripes can be recovered, thereby ensuring that none of the eight stripes is lost.

For example, refer to FIG. 10. When K is 3 and N is 2, two rows of chunks are buffered in eight SSDs at every three consecutive moments. In the two rows of chunks, a quantity of chunks in a same stripe is less than or equal to 2. For example, a computing device respectively writes 24 chunks in the $1^{st}$ batch to an SSD 1 to an SSD 8 at a moment T0 to a moment T2, where the 24 chunks are a chunk D00, a chunk D10, a chunk D20, a chunk D30, a chunk D40, a chunk D50, a chunk D60, a chunk D70, a chunk D80, a chunk D90, a chunk DA0, a chunk DB0, a chunk D01, a chunk D11, a chunk D21, a chunk D31, a chunk D41, a chunk D51, a chunk D61, a chunk D71, a chunk D81, a chunk D91, a chunk DA1, and a chunk DB1. In the $1^{st}$ write process of the $1^{st}$ batch, the chunk D00 and the chunk D10 to the chunk D70 are written, in the $2^{nd}$ write process of the $1^{st}$ batch, the chunk D80 and the chunk D90 to the chunk D31 are written, and in the $3^{rd}$ write process of the Pt batch, the chunk D41 and the chunk D51 to the chunk DB1 are written. Because three write processes are performed to the eight SSDs at three consecutive moments, each of the eight SSDs receives a chunk at the three consecutive moments, and each of the eight SSDs buffers a chunk at the three consecutive moments. Therefore, the 24 chunks, which are the chunk D00, the chunk D10, and the chunk D20 to the chunk DB1, are buffered in the eight SSDs at the three consecutive moments. Among the chunk D00, the chunk D10, and the chunk D20 to the chunk DB1, each stripe has a maximum of two chunks. Therefore, even if the eight SSDs simultaneously have a power failure, and all data buffered in the eight SSDs is lost, causing losses of the chunk D00, the chunk D10, and the chunk D20 to the chunk DB1, a maximum of two chunks are lost in each of eight stripes: a stripe 0, and a stripe 1 to a stripe 7. Therefore, each of the eight stripes can be recovered, thereby ensuring that none of the eight stripes is lost. Similarly, after chunks in the $2^{nd}$ batch are written at a moment T3 to a moment T5, it can also be ensured that during the period of writing to persistent storage, eight stripes are not lost due to a simultaneous power failure of the eight SSDs. After chunks in the $3^{rd}$ batch are written at a moment T6 to a moment T8, it can also be ensured that eight stripes are not lost due to a simultaneous power failure of the eight SSDs. After chunks in the $4^{rd}$ batch are written at a moment T9 to a moment T12, it can also be ensured that eight stripes are not lost due to a simultaneous power failure of the eight SSDs. In conclusion, after chunks in any write process in any batch are written, it can be ensured that eight stripes are not lost.

In an example scenario, refer to FIG. 11. When each of eight SSDs can buffer a maximum of three chunks and one stripe includes six data chunks and two parity chunks, a computing device performs the $1^{st}$ write process at a moment T0, performs the $2^{nd}$ write process at a moment T1, performs the $3^{rd}$ write process at a moment T2, and by analogy, performs the $12^{th}$ write process at a moment T11. When a current moment is set to T7, for three moments T4, T5, and T6 before T7, chunks written at the three moments are buffered in each of the eight SSDs. For moments T0, T1, T2, and T3 before T4, chunks written at the four moments have been persistently stored in each of the eight SSDs. When a power failure occurs at this moment, the eight SSDs lose chunks buffered at the moments T4, T5, and T6. However, for any stripe, no more than two chunks are lost among all the lost chunks. Because a 6+2 EC algorithm can tolerate losses of two chunks in one stripe, after being powered on, the computing device can recover the chunks at the moments T4, T5, and T6 by using the EC algorithm and based on chunks, which are still protected by the computing device, at the moment T7 to the moment T11 and chunks, which have been persistently stored in the storage devices, at the moments T0, T1, T2, and T3.

When N is equal to 1, each of chunks written in each batch belongs to a different stripe. For example, when one stripe includes seven data chunks and one parity chunk, eight chunks written in each batch respectively belong to eight different stripes. For example, refer to FIG. 10. Chunks written in the Pt batch include a chunk D00, a chunk D10, a chunk D20, a chunk D30, a chunk D40, a chunk D50, a chunk D60, and a chunk D70. The chunk D00 belongs to a stripe 0, the chunk D10 belongs to a stripe 1, the chunk D20 belongs to a stripe 2, the chunk D30 belongs to a stripe 3, the chunk D40 belongs to a stripe 4, the chunk D50 belongs to a stripe 5, the chunk D60 belongs to a stripe 6, and the chunk D70 belongs to a stripe 7. Chunks written in the $2^{nd}$ batch include a chunk D71, a chunk D01, a chunk D11, a chunk D21, a chunk D31, a chunk D41, a chunk D51, and a chunk D61. The chunk D71 belongs to the stripe 7, the chunk D01 belongs to a stripe 0, the chunk D11 belongs to the stripe 1, the chunk D21 belongs to the stripe 2, the chunk D31 belongs to the stripe 3, the chunk D41 belongs to the stripe 4, the chunk D51 belongs to the stripe 5, and the chunk D61 belongs to the stripe 6.

In addition, when N is greater than 1, a quantity of chunks that are in chunks written in each batch and that belong to a same stripe is less than or equal to N. For example, when one stripe includes six data chunks and two parity chunks, the quantity of chunks that are in eight corresponding chunks written in each batch and that belong to a same stripe may be less than or equal to 2. That is, the eight corresponding chunks written in each batch may respectively belong to eight different stripes, or two chunks in the eight corresponding chunks written in each batch belong to a same stripe. For another example, when one stripe includes six data chunks and three parity chunks, the quantity of chunks that are in nine corresponding chunks written in each batch and that belong to a same stripe may be less than or equal to 3. That is, the nine corresponding chunks written in each batch respectively belong to nine different stripes, two chunks in the nine corresponding chunks written in each batch belong to a same stripe, or three chunks in the nine corresponding chunks written in each batch belong to a same stripe.

It should be noted that step 602 is described by using chunks written in one batch as an example. Similarly, the computing device may determine chunks written in a plurality of batches. The computing device may determine chunks written in a plurality of batches, for example, determine chunks written in all batches, or the computing device may first determine chunks written in one batch, and after writing the chunks written in this batch, determine chunks written in a next batch. A determining order is not limited in this embodiment.

In some possible embodiments, for a same storage device in the M+N storage devices, a chunk that is in the chunks written in one batch and that is written to the storage device and a chunk that is in chunks written in a previous batch and that is written to the storage device may belong to different stripes. For example, refer to FIG. 10. For the SSD 1, among chunks written in the $1^{st}$ batch, the chunk D00 written to the SSD 1 belongs to the stripe 0, among chunks written in the $2^{nd}$ batch, the chunk D71 written to the SSD 1 belongs to the stripe 7, among chunks written in the 3rd batch, the chunk D62 written to the SSD 1 belongs to the stripe 6, among chunks written in the $4^{th}$ batch, the chunk D53 written to the SSD 1 belongs to the stripe 5, among chunks written in the $5^{th}$ batch, the chunk D44 written to the SSD 1 belongs to the stripe 4, among chunks written in the 6$^{th}$ batch, the chunk D35 written to the SSD 1 belongs to the stripe 3, among chunks written in the 7$^{th}$ batch, the chunk D26 written to the SSD 1 belongs to the stripe 2, and among chunks written in the 8$^{th}$ batch, the chunk P1 written to the SSD 1 belongs to the stripe 8. In this order, among the chunks written in the eight batches, the eight chunks written to the SSD 1 respectively belong to eight different stripes. For example, refer to FIG. 11. For the SSD 1, among chunks written in the 0 batch, the chunk D00 written to the SSD 1 belongs to the stripe 0, among chunks written in the 2$^{nd}$ batch, the chunk D72 written to the SSD 1 belongs to the stripe 7, among chunks written in the 3rd batch, the chunk D64 written to the SSD 1 belongs to the stripe 6, and among chunks written in the 4$^{th}$ batch, the chunk P5 written to the SSD 1 belongs to the stripe 5. In this order, among the chunks written in the four batches, the four chunks written to the SSD 1 respectively belong to four different stripes.

When chunks written in one batch include chunks in a plurality of write processes, a chunk written to the storage device in a write process in the batch and a chunk written to the storage device in a previous write process in the batch may belong to different stripes. For example, refer to FIG. 11. Among chunks in the 2$^{nd}$ write process in the 1$^{st}$ batch, the chunk D00 written to the SSD 1 belongs to the stripe 8, and among chunks in the 3rd write process in the 0 batch, the chunk D00 written to the SSD 1 belongs to the stripe 4. Therefore, in this order, among the chunks in the two write processes in the 0 batch, the two chunks written to the SSD 1 also respectively belong to two different stripes. Among chunks in the 2$^{nd}$ write process in the 2$^{nd}$ batch, the chunk D33 written to the SSD 1 belongs to the stripe 3, and among chunks in the 3rd write process in the 2$^{nd}$ batch, the chunk DB3 written to the SSD 1 belongs to the stripe 11. In this order, among the chunks in the two write processes in the 2$^{nd}$ batch, the two chunks written to the SSD 1 also respectively belong to two different stripes.

In this manner, chunks written to a same storage device belong to different stripes. In this case, different chunks in a same stripe are respectively stored in different storage devices. For example, eight chunks in a stripe 1 may be respectively stored in 8 different SSDs. However, for a redundancy algorithm such as an EC algorithm or a RAID algorithm, it is usually required that data can be recovered only if different chunks in a stripe are stored in different storage devices. Therefore, such a manner can satisfy the requirement of the redundancy algorithm.

603: The computing device respectively writes the chunks written in one batch to the M+N storage devices.

The computing device may respectively send, to the M+N storage devices, K chunks in the chunks written in one batch. The M+N storage devices may respectively receive the K chunks in the chunks written in one batch, respectively buffer the K chunks in the chunks written in one batch, and respectively persistently store the buffered K chunks. When K is greater than 1, for any storage device, the computing device may first write one chunk to the storage device in chronological order, and then write a next chunk to the storage device after the writing is completed, until the K chunks are written to the storage device.

When a storage device buffers a maximum of one chunk, each time the storage device receives one chunk, the storage device can persistently store one previously written chunk that is buffered, and update the previously written chunk in a buffer into one currently written chunk. For example, refer to FIG. 10. When the SSD 1 buffers a maximum of one chunk, the SSD 1 may persistently store D00 in the buffer when receiving D71, and update D00 in the buffer into D71. When a storage device buffers a maximum of K chunks, where K is greater than 1, each time the storage device receives one chunk, the storage device may persistently store one or more buffered chunks, and update chunks in the buffer into one currently written chunk. An older chunk buffered at an earlier moment may be persistently stored preferably. For example, refer to FIG. 10. When the SSD 1 buffers a maximum of three chunks, when the SSD 1 receives D53, the buffer of the SSD 1 includes D00, D71, and D62. The SSD 1 may persistently store buffered D00 and delete buffered D00, certainly, may persistently store buffered D00 and D71 and delete buffered D00 and D71, or certainly, may persistently store buffered D00, D80, and D41 and delete buffered D00, D80, and D41.

It should be noted that step 603 is described by using the chunks written in one batch as an example. Similarly, the computing device may respectively write chunks written in a plurality of batches to the M+N storage devices, until all chunks in the S stripes are written. Further, the computing device may respectively write, in chronological order, chunks written in each batch to the M+N storage devices. Correspondingly, the M+N storage devices may sequentially receive, in chronological order, the chunks written in each batch, sequentially buffer the chunks written in each batch, and persistently store the sequentially buffered chunks written in each batch. For example, when the computing device determines chunks written in P batches, the computing device first writes chunks written in the 1$^{st}$ batch to the M+N storage devices, then writes chunks written in the 2$^{nd}$ batch to the M+N storage devices, and the rest may be deduced by analogy until chunks written in a P$^{th}$ batch are written to the M+N storage devices. Correspondingly, the M+N storage devices first receive the chunks written in the 1$^{st}$ batch and buffer the chunks written in the 1$^{st}$ batch, and then receive the chunks written in the 2$^{nd}$ batch and buffer the chunks written in the 2$^{nd}$ batch, and the rest may be deduced by analogy until the chunks written in the P$^{th}$ batch are received and buffered.

For example, refer to FIG. 10. The computing device may determine chunks written in eight batches, and write the chunks written in the eight batches to eight SSDs to complete storage of eight stripes. Further, the computing device writes eight chunks in the 1$^{st}$ batch to the eight SSDs. To be specific, the chunk D00 is written to the SDD 1, the chunk D10 is written to the SDD 2, the chunk D20 is written to the SDD 3, the chunk D30 is written to the SDD 4, the chunk D40 is written to the SDD 5, the chunk D50 is written to the SDD 6, the chunk D60 is written to the SDD 7, and the chunk D70 is written to the SDD 8. Then, eight chunks in the 2$^{nd}$ batch are written to the eight SSDs. To be specific, the chunk D71 is written to the SDD 1, the chunk D01 is written to the SDD 2, the chunk D11 is written to the SDD 3, the chunk D21 is written to the SDD 4, the chunk D31 is written to the SDD 5, the chunk D41 is written to the SDD 6, the chunk D51 is written to the SDD 7, and the chunk D61 is written to the SDD 8. By analogy, eight chunks in the 8$^{th}$ batch are written to the eight SSDs. To be specific, the chunk P1 is written to the SDD 1, the chunk P2 is written to the SDD 2, the chunk P3 is written to the SDD 3, the chunk P4 is written to the SDD 4, the chunk P5 is written to the SDD 5, the chunk P6 is written to the SDD 6, the chunk P7 is written to the SDD 7, and the chunk P0 is written to the SDD 8. In this way, storage of the stripe 0 to the stripe 7 is completed.

It should be noted that the writing order shown in FIG. 10 is merely an optional implementation. When one stripe includes seven data chunks and one parity chunk and one storage device buffers a maximum of one chunk, in some possible embodiments, eight stripes may alternatively be written to eight storage devices in a writing order other than the order shown in FIG. 10. A data protection function can be implemented provided that eight chunks in each stripe are written to eight different storage devices and a total quantity of chunks in each stripe that are written in each batch and that are written to the eight storage devices does not exceed 1. In this way, a loss of any one of the eight stripes can be avoided when the eight storage devices all have a power failure.

For example, refer to FIG. 11. The computing device may determine chunks written in four batches, and write the chunks in the four batches to eight SSDs to complete storage of 12 stripes. Further, the computing device writes 24 chunks in the $1^{st}$ batch to eight SSDs through three write processes. To be specific, in the $1^{st}$ write process in the $1^{st}$ batch, the chunk D00 is written to the SDD 1, the chunk D10 is written to the SDD 2, the chunk D20 is written to the SDD 3, the chunk D30 is written to the SDD 4, the chunk D40 is written to the SDD 5, the chunk D50 is written to the SDD 6, the chunk D60 is written to the SDD 7, and the chunk D70 is written to the SDD 8. In the $2^{nd}$ write process in the $1^{st}$ batch, the chunk D80 is written to the SDD 1, the chunk D90 is written to the SDD 2, the chunk DA0 is written to the SDD 3, the chunk DB0 is written to the SDD 4, the chunk D01 is written to the SDD 5, the chunk D11 is written to the SDD 6, the chunk D21 is written to the SDD 7, and the chunk D31 is written to the SDD 8. By analogy, In the 3rd write process in the $4^{th}$ batch, the chunk Q9 is written to the SDD 1, the chunk QA is written to the SDD 2, the chunk QB is written to the SDD 3, the chunk Q4 is written to the SDD 4, the chunk Q5 is written to the SDD 5, the chunk Q6 is written to the SDD 6, the chunk Q7 is written to the SDD 7, and the chunk Q8 is written to the SDD 8. In this way, storage of the stripe 0 to the stripe 11 is completed.

It should be noted that the writing order shown in FIG. 11 is merely an optional implementation. When one stripe includes six data chunks and two parity chunks and one storage device buffers a maximum of three chunks, in some possible embodiments, 12 stripes may alternatively be written to eight storage devices in a writing order other than the order shown in FIG. 11. A data protection function can be implemented provided that eight chunks in each stripe are written to eight different storage devices and a total quantity of chunks in each stripe that are written in every three write processes and that are written to the eight storage devices does not exceed 2. In this way, a loss of any one of the 12 stripes can be avoided when the eight storage devices all have a power failure.

In a possible implementation, each chunk in each stripe obtained in step 601 may be represented by an element in an array. Correspondingly, step 602 may be implemented by determining an element from an array.

Further, S stripes may be expressed as one array. The array includes S rows and M+N columns. Each of the S rows corresponds to a same stripe. For example, the $1^{st}$ row may correspond to the $1^{st}$ stripe, and the $2^{nd}$ row may correspond to the $2^{nd}$ stripe. Each of the M+N columns corresponds to a same position in the S stripes. For example, the $1^{st}$ column may correspond to the $1^{st}$ position in each stripe, and the $2^{nd}$ column may correspond to the $2^{nd}$ position in each stripe. Each element in an array may represent one chunk in one stripe. For example, an element in an $i^{th}$ row and a $j^{th}$ column represents a $j^{th}$ chunk in an $i^{th}$ stripe, where i is a positive integer less than or equal to S, and j is a positive integer less than or equal to M+N. For example, when the S stripes are expressed as an array dbuf[S][M+N], dbuf[S][M+N] may as shown below, where each element in dbuf[S][M+N] may be one Dij in FIG. 10 or FIG. 11:

$$dbuf[0][0], dbuf[0][1], \ldots, dbuf[0][M+N-2], dbuf[0][M+N-1]$$
$$dbuf[1][0], dbuf[1][1], \ldots, dbuf[1][M+N-2], dbuf[1][M+N-1]$$
$$dbuf[2][0], dbuf[2][1], \ldots, dbuf[2][M+N-2], dbuf[2][M+N-1]$$
$$\ldots$$
$$dbuf[s-2][0], dbuf[s-2][1], \ldots,$$
$$buf[s-2][M+N-2], dbuf[s-2][M+N-1]$$
$$dbuf[s-1][0], dbuf[s-1][1], \ldots,$$
$$buf[s-1][M+N-2], dbuf[s-1][M+N-1]$$

When step 602 is performed, when a storage device buffers a maximum of one chunk, each column of the array may be traversed from the $1^{st}$ column of the array. Each time M+N elements are determined, chunks corresponding to the determined M+N elements are used as chunks written in one batch. When S is equal to M+N, elements in an $(M+N)^{th}$ row are exactly elements in the last row in the array. In this case, chunks corresponding to elements in the $1^{st}$ column may be determined as chunks written in the $1^{st}$ batch, chunks corresponding to elements in the $2^{nd}$ column may be determined as chunks written in the $2^{nd}$ batch, and by analogy, chunks corresponding to elements in an $(M+N)^{th}$ column may be determined as chunks written in an $(M+N)^{th}$ batch. When S is greater than M+N, there are elements in another row after elements in an $(M+N)^{th}$ row in the array. In this case, chunks corresponding to an element in the $1^{st}$ row and the $1^{st}$ column to an element in the $(M+N)^{th}$ row and the $1^{st}$ column may be determined as chunks written in the $1^{st}$ batch. Elements in a next row are determined from an element in an $(M+N+1)^{th}$ row and the $1^{st}$ column. When a quantity of the determined elements has reached M+N, chunks corresponding to the determined M+N elements are used as chunks written in the $2^{nd}$ batch. When an element in an $S^{th}$ row and the $1^{st}$ column is determined, and a quantity of the determined element still does not reach M+N, elements in a next row continue to be determined from an element in the $1^{st}$ row and the $2^{nd}$ column until M+N elements are determined, and chunks corresponding to the determined M+N elements are used as chunks written in the $2^{nd}$ batch. The rest may be deduced by analogy. In addition, when a storage device can buffer K chunks and K is greater than 1, a manner of determining a chunk is similar to this, and a difference is that each time (M+N)*K elements are determined, chunks corresponding to the determined (M+N)*K elements are used as chunks written in one batch.

To avoiding writing a plurality of chunks in a same stripe to a same storage device, in a process of determining an element from an array, (M+N)*K elements may be used as a cycle. Each time (M+N)*K elements are determined, a storage device to which the $1^{st}$ chunk in a previous cycle is to be written may be used as the storage device to which the $1^{st}$ element in a current cycle is to be written. In other words, when (M+N)*K elements are determined in the previous cycle, an $i^{th}$ storage device is used as the storage device to which the chunk corresponding to the $1^{st}$ element determined in the previous cycle is to be written. When (M+N)*K elements are determined in the current cycle, an $(i+1)^{th}$ storage device may be used as the storage device to which the chunk corresponding to the 1st element determined in the current cycle is to be written. For any element in the 2nd element to the last element in the current cycle, a next storage device of a storage device to which a chunk corresponding to a previous element is to be written is used as the storage device to which a chunk corresponding to a current element is to be written.

For example, refer to FIG. 10. When M is 7, N is 1, and K is 1, every eight elements may be one cycle. Elements corresponding to the 1st cycle are dbuf[0][0] and dbuf[1][0] to dbuf[7][0]. A previous element of dbuf[1][0] is to be written to an $i^{th}$ SSD, and a next element of dbuf[1][0] is to be written to an $(i+1)^{th}$ SSD. Therefore, when an SSD to which dbuf[0][0] is to be written is the SSD 1, an SSD to which dbuf[1][0] is to be written is the SSD 2, an SSD to which dbuf[2][0] is to be written is the SSD 3, and by analogy, an SSD to which dbuf[7][0] is to be written is the SSD 8.

Elements corresponding to the 2nd cycle are dbuf[0][1] and dbuf[1][1] to dbuf[7][1]. Because both dbuf[0][1] and dbuf[0][0] belong to the stripe 0, to ensure that different chunks in the stripe 0 are written to different SSDs, dbuf[0][1] needs to be prevented from being written to the SSD 1 to which dbuf[0][0] has been written. In addition, because both dbuf[1][1] and dbuf[1][0] belong to the stripe 1, to ensure that different chunks in the stripe 1 are written to different SSDs, dbuf[1][1] needs to be prevented from being written to the SSD 2 to which dbuf[1][0] has been written. Therefore, the SSD 2 may be used as the SSD to which dbuf[0][1] is to be written. A previous element of dbuf[1][1] is to be written to the $i^{th}$ SSD, and a next element of dbuf[1][1] is to be written to the $(i+1)^{th}$ SSD. Therefore, an SSD to which dbuf[1][1] is to be written is the SSD 3, an SSD to which dbuf[2][1] is to be written is the SSD 4, and by analogy, an SSD to which dbuf[6][1] is to be written is the SSD 8. From dbuf[7][1], the 1st SSD is used again as the SSD to which writing is to be performed. In this case, an SSD to which dbuf[7][1] is to be written is the SSD 1.

Elements corresponding to the 3rd cycle are dbuf[0][2] and dbuf[1][2] to dbuf[7][2]. Because both dbuf[0][2] and dbuf[0][1] belong to the stripe 0, to ensure that different chunks in the stripe 0 are written to different SSDs, dbuf[0][2] needs to be prevented from being written to the SSD 2 to which dbuf[0][1] has been written. In addition, because both dbuf[1][2] and dbuf[1][1] belong to the stripe 1, to ensure that different chunks in the stripe 1 are written to different SSDs, dbuf[1][2] needs to be prevented from being written to the SSD 3 to which dbuf[1][1] has been written. Therefore, the SSD 3 may be used as the SSD to which dbuf[0][2] is to be written. A previous element of dbuf[1][2] is to be written to the $i^{th}$ SSD, and a next element of dbuf[1][2] is to be written to the $(i+1)^{th}$ SSD. Therefore, an SSD to which dbuf[1][2] is to be written is the SSD 4, an SSD to which dbuf[2][2] is to be written is the SSD 5, and by analogy, an SSD to which dbuf[5][2] is to be written is the SSD 8, From dbuf[5][2], the 1st SSD is used again as the SSD to which writing is to be performed. In this case, an SSD to which dbuf[6][2] is to be written is the SSD 1, and an SSD to which dbuf[7][2] is to be written is the SSD 2.

For example, refer to FIG. 11. When M is 6, N is 2, and K is 3, every 24 elements may be one cycle. Elements corresponding to the 1st cycle are dbuf[0][0], dbuf[1][0] to dbuf[7][0], dbuf[0][1], and dbuf[1][1] to dbuf[B][1]. A previous element of dbuf[1][0] is to be written to an $i^{th}$ SSD, and a next element of dbuf[1][0] is to be written to an $(i+1)^{th}$ SSD. Therefore, when an SSD to which dbuf[0][0] is to be written is the SSD 1, an SSD to which dbuf[1][0] is to be written is the SSD 2, an SSD to which dbuf[2][0] is to be written is the SSD 3, and by analogy, an SSD to which dbuf[7][0] is to be written is the SSD 8. From dbuf[8][0], the 1st SSD is used again as the SSD to which writing is to be performed. In this case, an SSD to which dbuf[8][0] is to be written is the SSD 1, an SSD to which dbuf[9][0] is to be written is the SSD 2, and by analogy, an SSD to which dbuf[3][1] is to be written is the SSD 8. From dbuf[4][1], the 1st SSD is used again as the SSD to which writing is to be performed. In this case, an SSD to which dbuf[9][0] is to be written is the SSD 2, and by analogy, an SSD to which dbuf[B][1] is to be written is the SSD 8.

Elements corresponding to the 2nd cycle are dbuf[0][2], dbuf[1][2] to dbuf[B][2], dbuf[0][3], and dbuf[1][3] to dbuf[B][3]. Because both dbuf[0][2] and dbuf[0][0] belong to the stripe 0, to ensure that different chunks in the stripe 0 are written to different SSDs, dbuf[0][2] needs to be prevented from being written to the 1st SSD to which dbuf[0][0] has been written. In addition, because both dbuf[1][2] and dbuf[1][0] belong to the stripe 1, to ensure that different chunks in the stripe 1 are written to different SSDs, dbuf[1][2] needs to be prevented from being written to the 2nd SSD to which dbuf[1][0] has been written. Therefore, the SSD 2 may be used as the SSD to which dbuf[0][2] is to be written. A previous element of dbuf[1][2] is to be written to the $i^{th}$ SSD, and a next element of dbuf[1][2] is to be written to the $(i+1)^{th}$ SSD. Therefore, an SSD to which dbuf[1][2] is to be written is the SSD 3, an SSD to which dbuf[2][2] is to be written is the SSD 4, and by analogy, an SSD to which dbuf[6][2] is to be written is the SSD 8, and an SSD to which dbuf[7][2] is to be written is the SSD 1. For a next element dbuf[8][2] of dbuf[7][2], similarly, because the SSD 2 is the 1st disk to which writing is to be performed in the 2nd cycle, similar to dbuf[0][2], the SSD 2 is used as the SSD to which dbuf[8][2] is to be written. In this case, an SSD to which dbuf[9][2] is to be written is the SSD 3. A previous element of dbuf[9][2] is to be written to the $i^{th}$ SSD, and a next element of dbuf[9][2] is to be written to the $(i+1)^{th}$ SSD. Therefore, an SSD to which dbuf[A][2] is to be written is the SSD 4, an SSD to which dbuf[B][2] is to be written is the SSD 5, and by analogy, an SSD to which dbuf[2][3] is to be written is the SSD 8. From dbuf[3][3], the 1st SSD is used again as the SSD to which writing is to be performed. In this case, an SSD to which dbuf[3][3] is to be written is the SSD 1. For a next element dbuf[4][3] of dbuf[3][3], similarly, because the SSD 2 is the 1st disk to which writing is to be performed in the 2nd cycle, similar to dbuf[0][2], the SSD 2 is used as the SSD to which dbuf[4][3] is to be written. The rest may be deduced by analogy.

Elements corresponding to the 3rd cycle are dbuf[0][4], dbuf[1][4] to dbuf[B][4], dbuf[0][5], and dbuf[1][5] to dbuf[B][5]. Because both dbuf[0][4] and dbuf[0][2] belong to the stripe 0, to ensure that different chunks in the stripe 0 are written to different SSDs, dbuf[0][4] needs to be prevented from being written to the SSD 2 to which dbuf[0][2] has been written. In addition, because both dbuf[1][4] and dbuf[1][2] belong to the stripe 1, to ensure that different chunks in the stripe 1 are written to different SSDs, dbuf[1][4] needs to be prevented from being written to the SSD 3 to which dbuf[1][2] has been written. Therefore, the SSD 3 may be used as the SSD to which dbuf[0][4] is to be written. A previous element of dbuf[1][4] is to be written to the $i^{th}$ SSD, and a next element of dbuf[1][4] is to be written to the $(i+1)^{th}$ SSD. Therefore, an SSD to which dbuf[1][4] is to be written is the SSD 4, and an SSD to which dbuf[2][4] is to be written is the SSD 5. The rest may be deduced by analogy.

When the array is the foregoing dbuf[s][M+N] and a column number is expressed as y, in a process of determining an element, when a remainder of a column number y*S/(M+N) of a current element is 0, it may be determined that the current element is the Pt element in a current cycle, when a remainder of a column number y*S/(M+N) of a current element is not 0, it may be determined that the current element is not the Pt element in a current cycle. Therefore, in the process of determining an element, for dbuf[0][y], before the element dbuf[0][y] in which a remainder of y*s/(m+n) is 0 is met, in an order from the Pt storage device to an $(M+N)^{th}$ storage device, each storage device may be used as the storage device to which a chunk corresponding to a corresponding element is to be written. For example, when one stripe includes six data chunks and two parity chunks and each storage device can buffer three chunks, in y*S/(M+N) whose remainder is 0, a value of y is 0, 2, 4, or 6. In this case, when the Pt storage device is used as the storage device to which dbuf[0][0] is to be written, before dbuf[0][2] is met, a next storage device may be used as the storage device to which a next element is to be written. Before dbuf[0][2] is met, the $2^{nd}$ storage device may be used as the storage device to which dbuf[0][2] is to be written. Subsequently, before dbuf[0][4] is met, the next storage device continues to be used as the storage device to which the next element is to be written. Before dbuf[0][4] is met, the $3^{rd}$ storage device may be used as the storage device to which dbuf[0][4] is to be written. Subsequently, the next storage device continues to be used as the storage device to which the next element is to be written. The rest may be deduced by analogy.

In this arranging manner, when step 603 is performed, when a current write process starts from an $x^{th}$ storage device, writing is sequentially performed to an $(x+1)^{th}$ storage device, an $(x+2)^{th}$ storage device, ..., and an $(M+N)^{th}$ storage device. Then, writing continues to be performed from the $1^{st}$ storage device to an $(x-1)^{th}$ storage device. Subsequently, a next write process is performed and still starts from the $x^{th}$ storage device, and writing is sequentially performed to the $(x+1)^{th}$ storage device, the $(x+2)^{th}$ storage device, ..., and the $(M+N)^{th}$ storage device. Then, writing continues to be performed from the 0 storage device to the $(x-1)^{th}$ storage device. When a next cycle begins, that is, (M+N)*K chunks have been written, writing is sequentially performed to the $(x+1)^{th}$ storage device, the $(x+2)^{th}$ storage device, the $(x+3)^{th}$ storage device, ..., and the $(M+N)^{th}$ storage device. Then, writing continues to be performed from the 0 storage device to the $x^{th}$ storage device.

For example, when the array is the foregoing dbuf[s][M+N] and S=M+N, a writing order may be shown as follows:

$dbuf[0][0], dbuf[1][0], dbuf[2][0], \ldots, dbuf[s-2][0], dbuf[s-1][0]$ $dbuf[s-1][1], dbuf[0][1], dbuf[1][1],$ $\ldots, dbuf[s-3][1], dbuf[s-2][1]$ $\ldots$ $dbuf[2][s-2], dbuf[3][s-2], \ldots, dbuf[0][s-2], dbuf[1][s-2]$ $dbuf[1][s-1], dbuf[2][s-1], \ldots, dbuf[s-2][s-1], dbuf[0][s-1]$ Each row represents chunks written in one batch, each column corresponds to one storage device, and each element represents a chunk to be written to a corresponding storage device in a corresponding batch. For example, dbuf[0][0], dbuf[1][0], dbuf[M+N-2][0], and dbuf[s-1][0] represent chunks written in the $1^{st}$ batch, dbuf[0][0], dbuf[0][1], ..., and dbuf[0][M+N-1] correspond to the $1^{st}$ storage device, and dbuf[1][1] represents chunks written to the $1^{st}$ storage device in the $2^{nd}$ batch. By determining this writing order, in this 603, when the chunks written in the $1^{st}$ batch are respectively written to the M+N storage devices, in the order shown in the $1^{st}$ row, the chunk corresponding to dbuf[0][0], that is, the $1^{st}$ chunk in the $1^{st}$ stripe, is written to the $1^{st}$ storage device, the chunk corresponding to dbuf[1][0], that is, the $1^{st}$ chunk in the $2^{nd}$ stripe, is written to the $2^{nd}$ storage device, and by analogy, the chunk corresponding to dbuf[s-1][0], that is, the $1^{st}$ chunk in an $S^{th}$ stripe, is written to the $(M+N)^{th}$ storage device. When the chunks written in the $2^{nd}$ batch are respectively written to the M+N storage devices, in the order shown in the $2^{nd}$ row, the chunk corresponding to dbuf[0][1], that is, the $2^{nd}$ chunk in the $1^{st}$ stripe, is written to the $1^{st}$ storage device, the chunk corresponding to dbuf[1][1], that is, the $2^{nd}$ chunk in the $2^{nd}$ stripe, is written to the $2^{nd}$ storage device, by analogy, the chunk corresponding to dbuf[s-2][1], that is, the $2^{nd}$ chunk in an $(S-1)^{th}$ stripe, is written to the $(M+N)^{th}$ storage device, and the chunk corresponding to dbuf[s-1][1], that is, the $2^{nd}$ chunk in the $S^{th}$ stripe, is written to the $1^{st}$ storage device.

It should be noted that the foregoing is merely an example description of the manner of determining the writing order of a chunk, and does not limit the manner of determining the writing order of a chunk. In this embodiment, it only needs to be ensured that after chunks written in each batch are determined, a quantity of chunks that are in the chunks written in each batch and that belong to a same stripe is less than or equal to N. How to determine a writing order of each chunk is not limited in this embodiment.

604: When a power failure event is detected, the computing device obtains a first chunk and a second chunk in the S stripes.

The power failure event is that a power supply of a storage device stops providing electricity for the storage device. For example, the storage device is plugged out, or a device on which the storage device is located has a power failure. When the storage device has a power failure and the storage device has no backup power supply, data buffered in the storage device may be lost. In this case, the computing device can recover the lost data by performing step 604 and step 605. Optionally, the power failure event may be an event that the M+N storage devices all have a power failure. In an example scenario, the computing device may be a storage server, and the M+N storage devices may be M+N SSDs plugged into the storage server. When the storage server has a power failure, the M+N SSDs all have a power failure, and the storage server may perform this step after being powered on again.

The first chunk is a chunk that has not been written to the M+N storage devices yet. Further, the first chunk may be a chunk on which each write process has not been performed yet. For example, when the S stripes need to be written through a total of W write processes, and the $1^{st}$ write process to a $P^{th}$ write process have been performed when the power failure occurs, the first chunk may be a chunk in a $(P+1)^{th}$ write process to a $W^{th}$ write process. For example, refer to FIG. 12. 12 stripes are written through 12 write processes. When a power failure moment is a moment T6 and T6 corresponds to the $6^{th}$ write process (that is, the $1^{st}$ write process in the $3^{rd}$ batch), the computing device has performed the $7^{th}$ write process and has not performed the $8^{th}$ write process to the $12^{th}$ write process when the power failure occurs. Therefore, the first chunk may be a chunk in the $8^{th}$ write process to the $12^{th}$ write process, that is, one of chunks corresponding to a moment T7 to a moment T11.

In a specific process of obtaining the first chunk, the first chunk may be buffered in a data buffer of the computing device in advance. In this case, the computing device may obtain the first chunk from the data buffer. When the data buffer is a volatile memory, the data buffer may be protected by a backup power supply. When a power failure occurs, the first chunk in the data buffer may be stored in storage space by using electricity provided by the backup power supply. After being powered on, the computing device may store the first chunk from the storage space to the data buffer again, and then read the first chunk from the data buffer. When the data buffer is a non-volatile memory, during a power failure, the first chunk in the data buffer is not lost. Therefore, after being powered on, the computing device may directly read the first chunk from the data buffer.

The second chunk is a chunk that has been persistently stored in the M+N storage devices. The second chunk may not be lost when a power failure occurs.

When the S stripes need to be written through a total of W batches of writing, each storage device buffers chunks written in a maximum of K batches, and the computing device has performed the $1^{st}$ write process to the $P^{th}$ write process when a power failure occurs, chunks buffered in M+N buffer devices are chunks in a $(P-K-1)^{th}$ write process to chunks in a $(P-1)^{th}$ write process. It is possible that these chunks have not been persistently stored yet. However, chunks written before these chunks, to be specific, chunks in the $1^{st}$ write process to a $(P-K)^{th}$ write process, have been persistently stored. Therefore, the second chunk may be a chunk in the $1^{st}$ write process to the $(P-K)^{th}$ write process.

Figure 12:
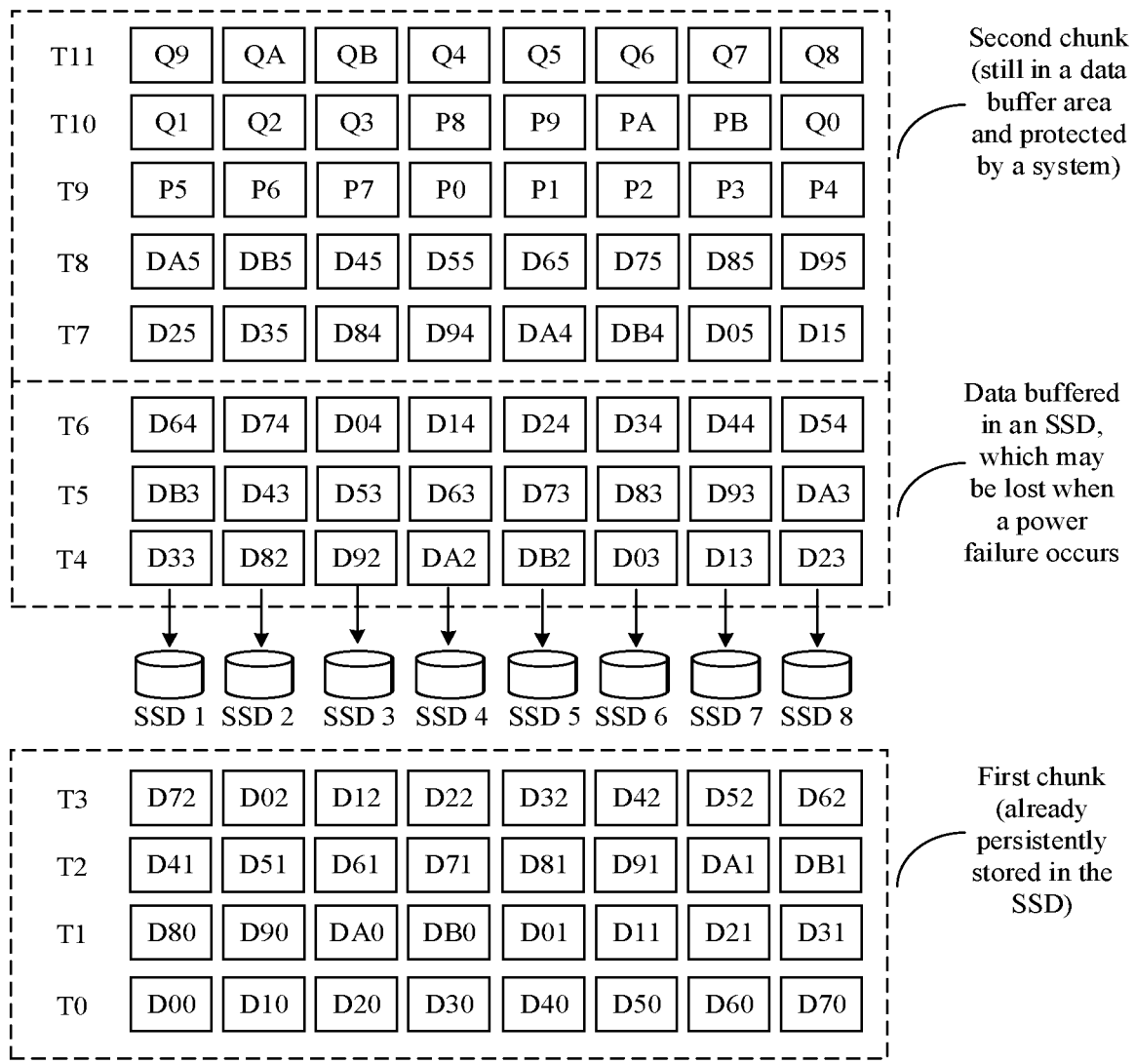
FIG. 12 is a schematic diagram of recovering a lost chunk after a power failure according to an embodiment of this disclosure.

For example, refer to FIG. 12. 12 stripes need to be written through a total of 12 write processes. When the storage device buffers chunks written in a maximum of three batches, a power failure moment is the moment T6, when the power failure occurs, the chunks buffered in the M+N storage devices may be chunks corresponding to the moment T4 to chunks corresponding to the moment T6, in other words, chunks in the $5^{th}$ write process to chunks in the $7^{th}$ write process. However, chunks written before the moment T4 have been persistently stored. Therefore, the second chunk may be a chunk corresponding to the moment T0 to the moment T3, in other words, a chunk in the $1^{st}$ write process to the $4^{th}$ write process.

In a specific process of obtaining the second chunk, the second chunk may be stored in a persistent storage medium of the storage device. In this case, the computing device may read the second chunk from the persistent storage medium of the storage device. An SSD is used as an example, and the computing device may read the second chunk from a NAND flash of the SSD.

605: The computing device recovers data of a lost chunk in the S stripes based on the first chunk and the second chunk.

The computing device may detect, based on the first chunk and the second chunk, whether each of the S stripes is complete. When a chunk in any stripe is lost, the computing device may obtain a remaining chunk in the stripe from the first chunk and the second chunk. The computing device may recover the lost chunk in the stripe based on the remaining chunk in the stripe by using the RAID algorithm or the EC algorithm. A quantity of chunks that are in chunks written in each batch and that belong to a same stripe is less than or equal to N. Therefore, when a power failure occurs at any moment, a quantity of chunks in a same stripe that are buffered in the M+N storage devices is less than or equal to N. In this case, a quantity of lost chunks in a same stripe is also less than or equal to N. Therefore, even if a chunk is lost in each stripe, the lost chunk can be recovered by using a remaining chunk and the redundancy algorithm. In this way, no stripe is actually lost, and each stripe can be protected.

Figure 13:
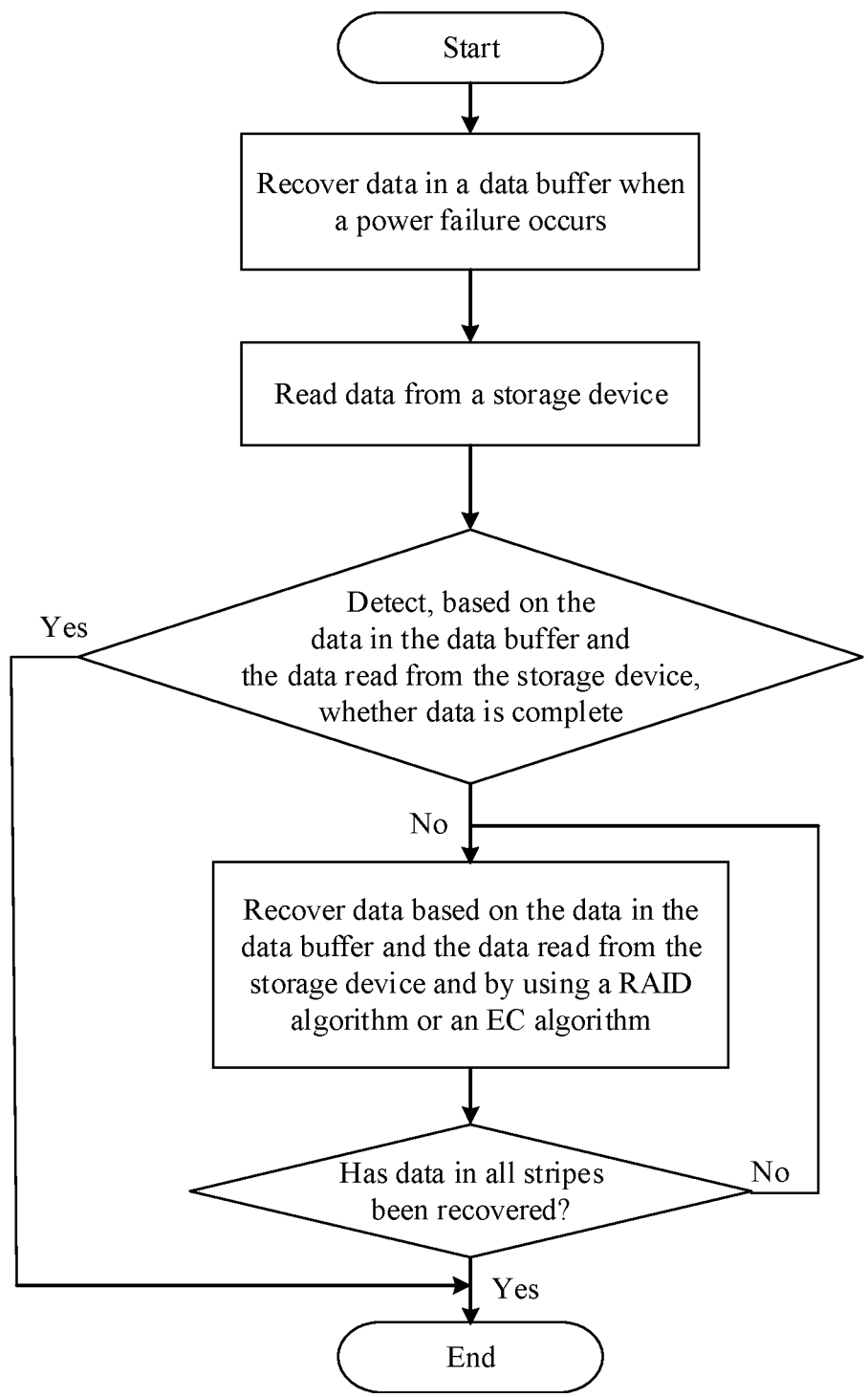
FIG. 13 is a flowchart of data recovery according to an embodiment of this disclosure.

For example, refer to FIG. 13. A data recovery procedure may include the following steps.

Step 1: Recover data in a data buffer when a power failure occurs.

Step 2: Read data from a storage device.

Step 3: Detect, based on the data in the data buffer and the data read from the storage device, whether data is complete, and when the data is not complete, perform step 4, when the data is complete, end the procedure.

Step 4: Recover data based on the data in the data buffer and the data read from the storage device and by using a RAID algorithm or an EC algorithm.

Step 5: Determine whether lost data in the stripe has been recovered, and when data in any stripe has not been recovered yet, continue to perform step 4, when data in all stripes has been recovered, end the procedure.

This embodiment provides a solution in which a loss of stripes buffered in storage devices can be avoided without relying on backup power supplies of the storage devices when all the storage devices simultaneously have a power failure. By improving an order of writing chunks in each stripe to storage devices, M+N chunks written in one batch to a same stripe are improved as N or fewer chunks written in one batch to a same stripe. In this case, for each stripe, because a quantity of chunks in the stripe that are simultaneously written to M+N storage devices is less than or equal to N, a quantity of chunks in the stripe that are simultaneously buffered to the M+N storage devices is also less than or equal to N. Therefore, even if all data buffered in the M+N storage devices is lost because the M+N storage devices all have a power failure at any moment, the quantity of lost chunks in the stripe is less than or equal to N. Therefore, a lost chunk in the stripe can be recovered by using a redundancy algorithm, thereby avoiding losing data of the stripe. By using this solution, even if a storage device has no backup power supply, a data loss can be avoided, and reliability of data storage can be ensured. Therefore, the backup power supply does not need to be installed for the storage device. In this way, inner space occupied by the backup power supply in the storage device can be saved, so that the storage device can have larger inner space to place a storage medium, thereby improving a storage capacity of the storage device. In addition, costs of manufacturing the backup power supply can be saved, thereby reducing costs of the storage device. Furthermore, a limitation caused by the backup power supply to a service life of the storage device can be avoided.

Figure 14:
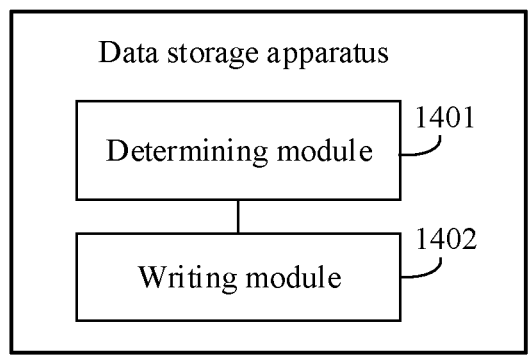
FIG. 14 is a schematic structural diagram of a data storage apparatus according to an embodiment of this disclosure.

FIG. 14 is a schematic structural diagram of a data storage apparatus according to an embodiment of this disclosure. As shown in FIG. 14, the apparatus includes a determining module 1401 configured to perform step 602, and a writing module 1402 configured to perform step 603.

Optionally, that a quantity of chunks that are in the chunks written in one batch and that belong to a same stripe is less than or equal to N includes, when N is equal to 1, each of the chunks written in one batch belongs to a different stripe.

Optionally, for each storage device in the M+N storage devices, a chunk that is in the chunks written in one batch and that is written to the storage device and a chunk that is in chunks written in a previous batch and that is written to the storage device belong to different stripes.

Optionally, S is obtained based on M, N, and K, and K is a maximum quantity of chunks buffered in each storage device.

Optionally, S is obtained by using the following formula:

$$S \geq \operatorname{ceil}\left(\frac{(M+N)*K}{N}\right),$$

where ceil represents a rounding up operation, and K is the maximum quantity of chunks buffered in each storage device.

Optionally, the apparatus further includes an obtaining module configured to perform step 604, and a recovery module configured to perform step 605.

It should be noted that, when the data storage apparatus provided in the embodiment in FIG. 14 stores data, division of the foregoing functional modules is merely used as an example for description. In actual application, the foregoing functions may be allocated to different functional modules for implementation as required. That is, an internal structure of the computing device is divided into different function modules, to implement all or some of the functions described above. In addition, the data storage apparatus provided in the foregoing embodiment and the data storage method embodiment belong to a same concept. For a specific implementation process of the data storage apparatus, refer to the method embodiment. Details are not described herein again.

In a possible product form, the computing device in the embodiments of this disclosure may be implemented by using a chip. The chip includes a processing circuit and an output interface internally connected to the processing circuit for communication. The processing circuit is configured to perform step 601, step 602, step 604, and step 605. The output interface is configured to perform step 603. Optionally, the chip may further include a storage medium. The storage medium is configured to store an instruction to be executed by the processing circuit.

All the foregoing optional technical solutions may be arbitrarily combined into an optional embodiment of this disclosure. Details are not described herein.

In a possible product form, the computing device described in the embodiments of this disclosure may alternatively be implemented by using one or more FPGAs, a PLD, a controller, a state machine, gate logic, a discrete hardware component, any other suitable circuit, or any combination of circuits capable of performing the various functions described throughout this disclosure.

A person of ordinary skill in the art may be aware that, in combination with the examples described in the embodiments disclosed in this specification, method steps and modules may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular disclosure, but it should not be considered that the implementation goes beyond the scope of this disclosure.

It may be clearly understood by a person skilled in the art that, for the purpose of convenient and brief description, for a detailed working process of the foregoing system, apparatus, and module, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces, indirect couplings or communication connections between the apparatuses or modules, or electrical connections, mechanical connections, or connections in other forms.

The modules described as separate parts may or may not be physically separate, and parts displayed as modules may or may not be physical modules, may be located in one position, or may be distributed on a plurality of network modules. Some or all the modules may be selected according to actual needs to achieve the objectives of the solutions of the embodiments in this disclosure.

In addition, functional modules in this disclosure may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of this disclosure essentially, or the part contributing to the conventional technology, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this disclosure. The foregoing storage medium includes any medium that can store program code, such as a Universal Serial Bus (USB) flash drive, a removable hard disk, a read-only memory (ROM), a RAM, a magnetic disk, or an optical disc.

What is claimed is:

1. A method comprising:
   determining, from S stripes, first chunks written in one batch, wherein a quantity of second chunks that are in the first chunks and that belong to a same stripe is less than or equal to N, wherein each of the S stripes comprises (M+N) chunks, wherein the (M+N) chunks comprise M data chunks and N parity chunks, and wherein S, M, and N are positive integers; and
   writing the first chunks to M+N storage devices.

2. The method of claim 1, wherein the same stripe comprises less than or equal to one chunk in the first chunks when N is equal to one.

3. The method of claim 1, wherein, for a storage device in the M+N storage devices, a third chunk that is in the first chunks and that is written to the storage device and a fourth chunk that is in fifth chunks written in a previous batch and that is written to the storage device are from different stripes.

4. The method of claim 1, wherein after writing the first chunks, the method further comprises:
  obtaining a third chunk and a fourth chunk in the S stripes when data in a fifth chunk in the S stripes is lost, wherein the third chunk has not been written to the M+N storage devices, and wherein the fourth chunk has been persistently stored in the M+N storage devices; and
  recovering the data based on the third chunk and the fourth chunk.

5. The method of claim 1, wherein before determining the first chunks, the method further comprises obtaining the S stripes.

6. The method of claim 5, further comprising:
  obtaining to-be-stored data;
  buffering the to-be-stored data in a data buffer area; and
  dividing the to-be-stored data in the data buffer area into the S stripes.

7. The method of claim 6, further comprising dividing each of the S stripes into the M data chunks.

8. The method of claim 7, further comprising calculating the N parity chunks based on the M data chunks.

9. An apparatus comprising:
  a processor; and
  an interface coupled to the processor, wherein the processor is configured to:
    determine, from S stripes, first chunks written in one batch, wherein a quantity of second chunks that are in the first chunks and that belong to a same stripe is less than or equal to N, wherein each of the S stripes comprises (M+N) chunks, wherein the (M+N) chunks comprise M data chunks and N parity chunks, and wherein S, M, and N are positive integers; and
    write the first chunks to M+N storage devices.

10. The apparatus of claim 9, wherein the same stripe comprises less than or equal to one chunk in the first chunks when N is equal to one.

11. The apparatus of claim 9, wherein, for a storage device in the M+N storage devices, a third chunk that is in the first chunks and that is written to the storage device and a fourth chunk that is in fifth chunks written in a previous batch and that is written to the storage device are from different stripes.

12. The apparatus of claim 9, wherein the processor is further configured to:
  obtain a third chunk and a fourth chunk in the S stripes when data in a fifth chunk in the S stripes is lost, wherein the third chunk has not been written to the M+N storage devices, and wherein the fourth chunk has been persistently stored in the M+N storage devices; and
  recover the data based on the third chunk and the fourth chunk.

13. The apparatus of claim 9, wherein before determining the first chunks, the processor is further configured to obtain the S stripes.

14. The apparatus of claim 13, wherein the processor is further configured to:
  obtain to-be-stored data;
  buffer the to-be-stored data in a data buffer area; and
  divide the to-be-stored data in the data buffer area into the S stripes.

15. The apparatus of claim 14, wherein the processor is further configured to divide each of the S stripes into the M data chunks.

16. The apparatus of claim 15, wherein the processor is further configured to calculate the N parity chunks based on the M data chunks.

17. A storage system comprising:
  M+N storage devices; and
  a computing device coupled to the M+N storage devices and configured to:
    determine, from S stripes, first chunks written in one batch, wherein a quantity of second chunks that are in the first chunks and that belong to a same stripe is less than or equal to N, wherein each of the S stripes comprises (M+N) chunks, wherein the (M+N) chunks comprise M data chunks and N parity chunks, and wherein S, M, and N are positive integers; and
    write the first chunks to the M+N storage devices.

18. The storage system of claim 17, wherein the same stripe in the S stripes comprises less than or equal to one chunk in the first chunks when N is equal to one.

19. The storage system of claim 17, wherein, for a storage device in the M+N storage devices, a third chunk that is in the first chunks and that is written to the storage device and a fourth chunk that is in fifth chunks written in a previous batch and that is written to the storage device are from different stripes.

20. The storage system of claim 17, wherein the computing device is further configured to:
  obtain a third chunk and a fourth chunk in the S stripes when data in a fifth chunk in the S stripes is lost, wherein the third chunk has not been written to the M+N storage devices, and wherein the fourth chunk has been persistently stored in the M+N storage devices; and
  recover the data based on the third chunk and the fourth chunk.

* * * * *